US011411850B2

(12) United States Patent
Iwai et al.

(10) Patent No.: US 11,411,850 B2
(45) Date of Patent: Aug. 9, 2022

(54) TRAFFIC ANALYSIS APPARATUS, METHOD, AND PROGRAM

(71) Applicant: NEC CORPORATION, Tokyo (JP)

(72) Inventors: Takanori Iwai, Tokyo (JP); Anan Sawabe, Tokyo (JP); Sweety Suman, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/980,154

(22) PCT Filed: Mar. 13, 2019

(86) PCT No.: PCT/JP2019/010197
§ 371 (c)(1),
(2) Date: Sep. 11, 2020

(87) PCT Pub. No.: WO2019/176997
PCT Pub. Date: Sep. 19, 2019

(65) Prior Publication Data
US 2021/0014144 A1    Jan. 14, 2021

(30) Foreign Application Priority Data

Mar. 14, 2018  (JP) .............................. JP2018-047279

(51) Int. Cl.
*H04L 12/26* (2006.01)
*H04L 12/24* (2006.01)
(Continued)

(52) U.S. Cl.
CPC ......... *H04L 43/0888* (2013.01); *G06N 7/005* (2013.01); *H04L 41/145* (2013.01);
(Continued)

(58) Field of Classification Search
CPC ... H04L 43/0888; H04L 41/145; H04L 43/04; H04L 43/0876; H04L 41/5009;
(Continued)

(56) References Cited

U.S. PATENT DOCUMENTS 7,386,611 B2   6/2008  Dias et al.
8,352,607 B2   1/2013  Dias et al.
(Continued)

FOREIGN PATENT DOCUMENTS

JP   2003-244195 A   8/2003
JP   2006-518887 A   8/2006
(Continued)

OTHER PUBLICATIONS

Yasuko Matsubara et al., "Fully Automatic Mining of Large Time-series Datasets", Information Processing Society of Japan, Database, Jun. 2014, pp. 37-50, vol. 17, No. 2.
(Continued)

*Primary Examiner* — Tonia L Dollinger
*Assistant Examiner* — Mehulkumar J Shah
(74) *Attorney, Agent, or Firm* — Sughrue Mion, PLLC

(57) ABSTRACT

A traffic analysis apparatus includes an information amount calculation part that calculates information amounts of a plurality of items of time series data relating to communication traffic and an input information selection part that selects at least one item of time series data based on the information amounts of the plurality of items of time series data.

18 Claims, 28 Drawing Sheets

(51) Int. Cl.
*H04L 43/0888* (2022.01)
*H04L 41/14* (2022.01)
*H04L 43/04* (2022.01)
*H04L 41/5067* (2022.01)
*G06N 7/00* (2006.01)
G06N 3/04 (2006.01)
H04L 41/142 (2022.01)

(52) U.S. Cl.
CPC .......... *H04L 41/5067* (2013.01); *H04L 43/04* (2013.01); *G06N 3/0472* (2013.01); *H04L 41/142* (2013.01)

(58) Field of Classification Search
CPC . H04L 41/5067; H04L 43/026; H04L 41/142; H04L 41/147; H04L 12/26; H04L 12/24; H04L 41/14; G06N 7/005; G06N 3/0472; G06N 7/00; G06N 3/04
USPC .................................................. 370/252, 253
See application file for complete search history.

(56) References Cited

U.S. PATENT DOCUMENTS

| | | | |
|---|---|---|---|
| 8,611,219 B2 * | 12/2013 | Golic | H04L 63/1425 726/13 |
| 10,158,534 B2 | 12/2018 | Acharya et al. | |
| 10,404,616 B2 | 9/2019 | Miyazawa et al. | |
| 2004/0002838 A1 * | 1/2004 | Oliver | G06K 9/726 703/2 |
| 2004/0111508 A1 | 6/2004 | Dias et al. | |
| 2007/0195700 A1 | 8/2007 | Katoh et al. | |
| 2008/0091826 A1 * | 4/2008 | Dias | H04L 47/122 709/226 |
| 2008/0183778 A1 * | 7/2008 | Neogi | G06F 16/22 |
| 2011/0107155 A1 | 5/2011 | Hirose et al. | |
| 2011/0137834 A1 * | 6/2011 | Ide | G06N 20/00 706/12 |
| 2013/0166623 A1 * | 6/2013 | Stanwood | H04W 4/00 709/202 |
| 2019/0230038 A1 * | 7/2019 | Hughes | H04L 45/72 |

FOREIGN PATENT DOCUMENTS

| | | |
|---|---|---|
| JP | 2007-116648 A | 5/2007 |
| JP | 2009-289221 A | 12/2009 |
| JP | 2013-187629 A | 9/2013 |
| JP | 2017-108292 A | 6/2017 |
| JP | 2017-167878 A | 9/2017 |
| JP | 2017-204712 A | 11/2017 |
| JP | 2018-007245 A | 1/2018 |
| WO | 2009/090939 A1 | 7/2009 |

OTHER PUBLICATIONS

Andrew W. Moore et al., "Internet Traffic Classification Using Bayesian Analysis Techniques", SIGMETRICS'05 (Proceedings of the 2005 ACM SIGMETRICS international conference on Measurement and modeling of computer systems), 2005, pp. 1-11, Jun. 6-10, Banff, Alberta, Canada.
Richman, Moorman et al., "Physiological time-series analysis using approximate entropy and sample entropy", Am J Physiol Heart Circ Physiol, Jun. 2000, pp. H2039-H2049, vol. 278.
Satoh, Akihiro et al., "A Novel Method to Grasp The Detected Events in Event-based Management and Its Evaluation", IPSJ Journal, 2009, pp. 992-1001, vol. 50, No. 3, ISSN 1882-7837.
Sawabe, Anan et al., "Identification of Applications on Smartphone by Encrypted Traffic Analysis", IEICE Technical Report, 2017, pp. 1-6, vol. 117, No. 351, ISSN 0913-5685.
International Search Report of PCT/JP2019/010197 dated May 28, 2019 [PCT/ISA/210].
Japanese Office Action for JP Application No. 2021-119563 dated May 31, 2022 with English Translation.

* cited by examiner

SAMPLE ENTROPY: 0.09
INFERENCE ACCURACY: 82.6%

SAMPLE ENTROPY: 2.82
INFERENCE ACCURACY: 41.3% aij: PROBABILITY OF TRANSITIONING FROM STATE i TO STATE j
(STATE TRANSITION PROBABILITY)

301 :HMM aij: PROBABILITY OF TRANSITIONING FROM STATE i TO STATE j
(STATE TRANSITION PROBABILITY)

302: HIERARCHICAL HMM Θ

δij: PROBABILITY OF TRANSITIONING FROM STATE (GROUP) θi TO STATE θj
(STATE TRANSITION PROBABILITY)

ak;ij: PROBABILITY OF TRANSITIONING FROM STATE i TO STATE j IN GROUP k (k = 1,2)
(STATE TRANSITION PROBABILITY)

$\delta_{ij}$: (i,j = 1,2): PROBABILITY OF TRANSITIONING FROM STATE si TO STATE sj
(STATE TRANSITION PROBABILITY)

TRAFFIC ANALYSIS APPARATUS, METHOD, AND PROGRAM

CROSS REFERENCE TO RELATED APPLICATIONS

This application is a National Stage of International Application No. PCT/JP2019/010197, filed Mar. 13, 2019, claiming priority to Japanese Patent Application No. 2018-047279, filed Mar. 14, 2018, the contents of all of which are incorporated herein by reference in their entirety.

FIELD

The present invention relates to a traffic analysis apparatus, method, and program.

BACKGROUND

Advancement in communication services has moved performance indicators (for example, key performance indicators (KPIs) of telecommunications operators from, for example, communication quality (quality of service: QoS) to application quality (for example, quality of experience (QoE) and quality of control (QoC)). For example, the International Telecommunication Union Telecommunication Standardization Sector (ITU-T) has formulated QoE for Web-browsing/moving images (Recommendation ITU-T G.1031).

It is supposed that in the future, more importance will probably be placed on network control and network design based on application quality. For example, the ITU-T has defined QoE for Web access (ITU-T Recommendation G.1030: Estimating end-to-end performance in IP networks for data applications) and moving image delivery (Recommendation ITU-T P.1203: Parametric bitstream-based quality assessment of progressive download and adaptive audio-visual streaming services over reliable transport). Much discussion has been made on control over a network (a networked system) in the field of machine control as well. For example, much discussion will probably be made on performance indexes (QoP: Quality of Performance and QoC) of machine control over a network.

For example, the recent wide spread of IoT (Internet of Things) where things are connected to the Internet, has been accompanied by more sophisticated needs by communication users on communication quality. For example, in a case of an IoT application (as well as a non-IoT application), its operation state could change. There is an IoT application that transmits video (moving image) data captured by an IoT sensor camera (a vehicle-mounted camera or the like) to a server (cloud) or the like, via a network along with navigation data, etc. The server analyzes the received data in real time, and the application performs remote control or remote support (for example, self-driving car or driving support) based on an analysis result. In this case, video delivery (real-time video delivery) may be performed in accordance with fluctuation of throughput or the like of the network. In addition, in a case of an object recognition application using a wearable camera, etc., a required throughput differs depending on whether a server that receives video data from the wearable camera and the wearable camera collaboratively perform object recognition or whether the wearable camera alone tracks a target object. In addition, when a drone-mounted camera as an IoT device relays aerial video in real time, a required throughput also differs depending on an operation mode, examples of which include an operation mode in which video is delivered from the drone, an operation mode in which flight information (the location information, the altitude, the acceleration rate information, etc.) of the drone is transmitted, and an operation mode in which commands are set in the drone. In a network (for example, a wireless network, a core network, or a wide area network (WAN)), various kinds of communication traffic such as for electronic mails, still images, moving images (videos), and voices (telephone calls) flow therethrough. These kinds of communication traffic are known to have different characteristics for each communication service.

In the future, a telecommunications operator would be required to address:

sophistication of needs of communication users for communication quality;

communication according to a requirement on a per application basis;

provision of communication services in response to ever-changing application use state and so forth.

Thus, it will be an issue for a telecommunications operator to grasp a change in an application state.

In order for a telecommunications operator to provide "optimum communication quality in response to ever-changing use condition (application state) and improve a satisfaction level (QoE: quality of experience) of a communication user, the telecommunications operator needs to achieve fine communication control. Thus, for example, the telecommunications operator needs to increase the number of control target parameters (for example, communication band and fluctuation (jitter, etc.) of transmission delay), and implement a fine control period.

However, there is a limit to information that can be acquired by a telecommunications operator (by a network equipment provided by the telecommunications operator, for example).

For example, due to an increase in encrypted traffic flowing through a network and diversification of traffic, there is a limit on a technology called deep packet inspection (DPI) for inspecting inside of traffic. In addition, in view of the Personal Information Protection Law, there is a possibility that use of the DPI itself will be prohibited. In view of encryption or privacy, contents of communication data cannot be observed.

For example, the following information can be acquired from traffic flowing through a network:

5-tuple (for example, source/destination Internet protocol (IP) addresses/ports and protocol)) and traffic patterns (for example, throughput, packet size, packet transmission interval, etc.).

Herein, a throughput of traffic is a data transfer amount on a per unit time (bits per second). It is noted that in 3.17 of RFC 1242 (Request for Comments: standards by the Internet Engineering Task Force (IETF), for example), "throughput" is defined as "The maximum rate at which none of the offered frames are dropped by the device". Basically, throughput does not deviate from this definition.

A traffic flow is constituted by a group of packets having the same information in their respective IP header fields (a set of packets having the same pair of a destination IP address and port number and the same pair of a source IP address and port number). Traffic source address, traffic destination address, source port, destination port, and protocol number are referred to as "5-tuple".

The above network equipment that constitutes a network provided by the telecommunication operator does not have means for directly grasping what an application is used by a communication user (for example, terminal) and in what state an application is operating.

Traffic analysis based on machine learning is known to produce a lot of erroneous detection because of traffic noise. As one example of the traffic analysis based on machine learning, for example, Non-Patent Literature (NPL) 2 discloses a technique in which a supervised naive Bayesian classifier is used to classify traffic per application category (per Transmission Control Protocol (TCP) connection). As an input, feature values (flow duration, TCP port, packet inter-arrival time (average, variance, etc.), payload size (average, variance, etc.), effective bandwidth based upon entropy, Fourier transform of packet inter-arrival time) that are obtained from a terminated TCP connection and category information of the communication performed in the corresponding TCP connection are used. As an output, for example, a classification result per application category (network traffic assigned to an individual category) is obtained. According to the disclosure of NPL 2, since the flow duration of a flow (TCP connection) is used, a connection needs to be terminated.

NPL 1: Yasuko Matsubara, Yasushi Sakurai, Christos Faloutsos, "Fully Automatic Mining of Large Time-series Datasets," Information Processing Society of Japan, Database, Vol. 7, No. 2, pp. 37-50, June 2014

NPL 2: Andrew W. Moore, Denis Zuev, "Internet Traffic Classification Using Bayesian Analysis Techniques," SIGMETRICS'05 (Proceedings of the 2005 ACM SIGMETRICS international conference on Measurement and modeling of computer systems), Jun. 6-10, 2005, Banff, Alberta, Canada NPL 3: Richman, Moorman, "Physiological time-series analysis using approximate entropy and sample entropy," American Journal of Physiology, June 2000

SUMMARY

As described above, there is a limitation on the information that can be acquired by the telecommunications operator (communication equipment). There is demanded a system which can realize provision of communication services that satisfy application quality (which may be abbreviated as "app quality") without inspecting a communication traffic.

For example, in inference of an application status from a throughput of traffic flowing in a network, time series data changes unpredictably due to various complex factors. It is confirmed by the inventors of the present application that a sudden drop in a throughput causes an erroneous recognition of a change in time series data, as a result of which an inference accuracy of the application state does not improve.

When a plurality of items of time series data (e.g., time-synchronized) of communication traffic are used in an attempt to improve the accuracy of inference of an application state, the inference accuracy may conversely deteriorate.

In FIG. 1, time series data (waveforms) 11a, 11b, and 11c schematically illustrate examples of time series data such as throughput of communication traffic, packet data size, and packet inter-arrival time (all the time series data are time-synchronized). In the time series data 11a and 11b, a state transition is detected at the same timing $t_k$, however, the time series data 11c is a waveform pattern in which it is not clear at which point a state change occurs and a state transition is not recognized at the timing $t_k$.

When an application state is inferred based on a triplet of waveforms, a transition of the application state is inferred in the time series data 11a and 11b, but since a transition of the application state is not detected in the time series data 11c, the state transition criteria may not be met in the time series data 11a, 11b, and 11c as a whole and the timing $t_k$ may not be determined to be a transition of the application state. In this case, the inference accuracy deteriorates, and in creating an application state learning model from communication traffic, an accuracy of the model also deteriorates.

Further, a calculation amount (the number of steps) required to create a model linearly increases with the number of time series data used to infer an application state.

It is an object of the present invention to provide an apparatus, method, and program each enabling to ensure an accuracy of inferring a state from time series data of communication traffic while suppressing an increase in a calculation amount.

According to an aspect of the present invention, there is provided a traffic analysis apparatus comprising an information amount calculation part that calculates respective information amounts of a plurality of items of time series data relating to communication traffic, and an input information selection part that selects at least one item of time series data as an analysis target from the plurality of items of time series data based on the information amounts of the plurality of items of time series data.

According to an aspect of the present invention, there is provided a traffic analysis method including calculating respective information amounts of a plurality of items of time series data relating to communication traffic, and selecting at least one item of time series data as an analysis target from the plurality of items of time series data based on the information amounts of the plurality of items of time series data.

According to an aspect of the present invention, there is provided a program causing a computer to execute an information amount calculation process of calculating respective information amounts of a plurality of items of time series data relating to communication traffic, and an input information selection process of selecting at least one item of time series data based on the information amounts of the plurality of items of time series data.

According to the present invention, there is provided a non-transitory computer-readable medium (e.g., a semiconductor memory such as RAM (Random Access Memory), ROM (Read-Only Memory), and EEPROM (Electrically Erasable and Programmable ROM), HDD (Hard Disk Drive), CD (Compact Disc), and DVD (Digital Versatile Disc)) storing the program.

According to the present invention, it becomes possible to ensure an accuracy of inferring a state from time series data of communication traffic while suppressing an increase in a calculation amount with respect to the time series data.

DETAILED DESCRIPTION

Figure 28:
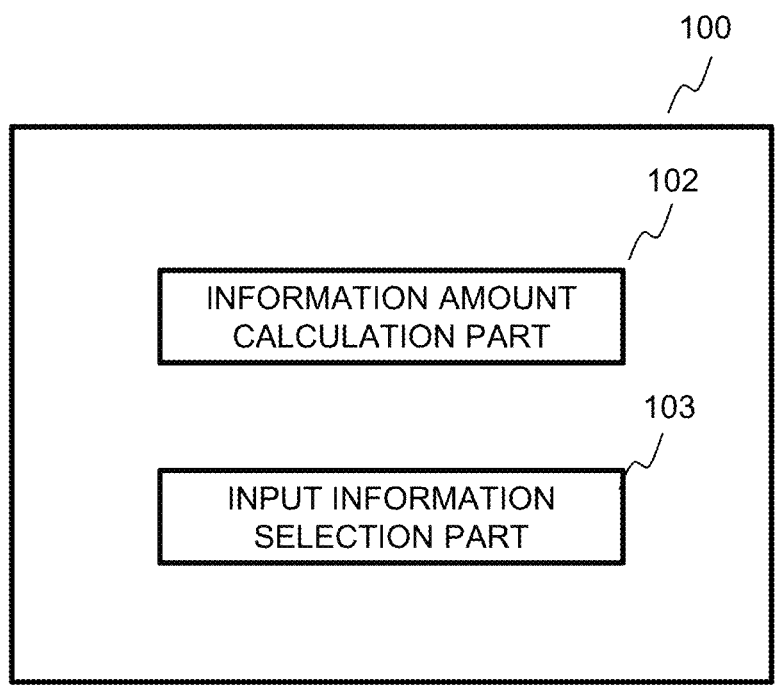
FIG. 28 is a diagram illustrating a basic mode of the present invention.

An example embodiment of the present invention will be described. According to a mode of the present invention, respective information amounts of a plurality of items of time series data relating to communication traffic are calculated, and time series data of an analysis target is selected from the plurality of items of time series data based on the information amounts. Referring to FIG. 28, a traffic analysis apparatus 100 in a mode of the present invention includes an information amount calculation part 102 that calculates an information amount of each of a plurality of items of time series data relating to communication traffic, and an input information selection part 103 that selects at least one item of time series data as an analysis target from the plurality of items of time series data based on the information amounts of the plurality of items of time series data.

In a mode of the present invention, the plurality of items of time series data relating to communication traffic may be time series data with a plurality of attributes having a common time axis. The time series data sets of a plurality of attributes are also referred to as time series data of multiple types.

In a mode of the present invention, as the information amount, an information amount that serves as an index indicating suitability of time series data for extracting a characteristic pattern, such as a changing point (state transition point) in time series data of communication traffic, is used.

In a mode of the present invention, the traffic analysis apparatus 100 may include a model creation part (such as a model creation part 104 in FIG. 2 described later) that creates a probabilistic state transition model representing a pattern and a transition thereof in time series data of communication traffic selected by the input information selection part 103 based on the time series data.

In a mode of the present invention, the traffic analysis apparatus 100 may perform the following.

modeling a transition of a state (application states) in time series data of communication traffic selected by the input information selection part 103 with a state transition model using a hidden Markov model, grouping a plurality of hidden Markov states corresponding to similar fluctuation patterns in one group, creating a hierarchical model that represents the plurality of hidden Markov states grouped in one group as an upper layer hidden Markov model state immediately above the hidden Markov model According to a mode of the present invention, by narrowing down the number of time series data used to infer a state of an application state which is a source of communication traffic, to time series data from which a characteristic pattern is easily extracted, an increase in a calculation amount (the number of steps) required to create a model can be suppressed and an accuracy of inference of the application state can be improved.

Example Embodiment 1

Figure 2:
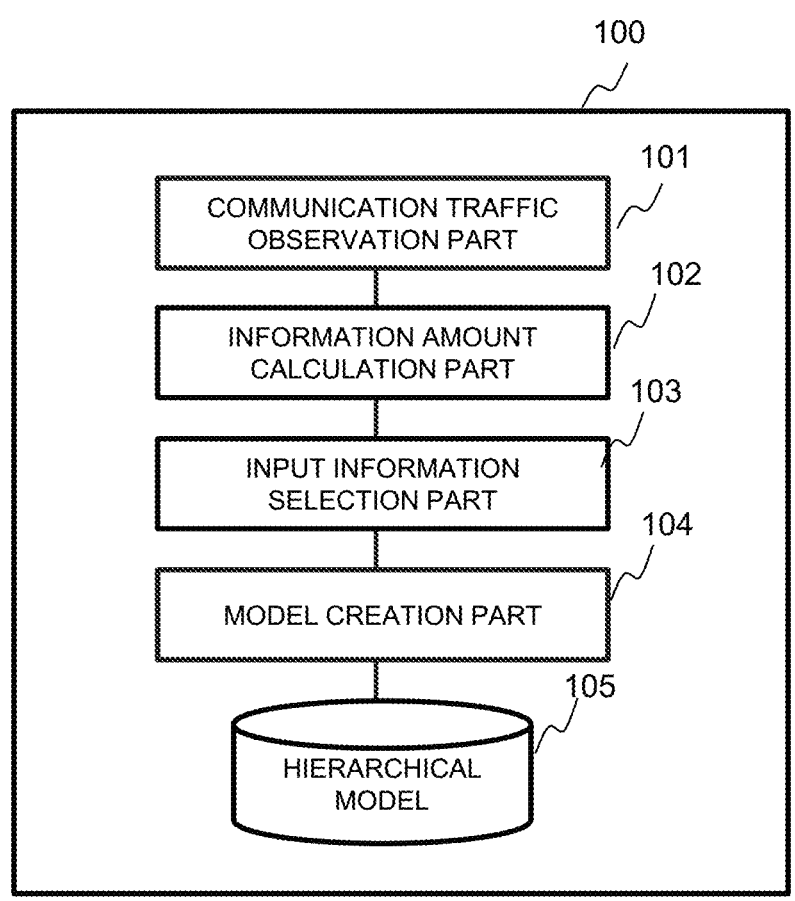
FIG. 2 is a diagram illustrating a configuration example of an example embodiment 1 of the present invention.

FIG. 2 is a diagram illustrating an example embodiment 1 of the present invention. When creating a model, the traffic analysis apparatus 100 of the example embodiment 1 improves an accuracy of inference of an application state without dealing with unnecessary data by detecting time series data from which it is easy to extract characteristics (states) among multiple type time series data of communication traffic. Referring to FIG. 2, the traffic analysis apparatus 100 includes a communication traffic observation part 101, an information amount calculation part 102, an input information selection part 103, and a model creation part 104.

The communication traffic observation part 101 monitors communication traffic (communication traffic to be analyzed) flowing through a network and acquires time series data of multiple types such as throughput, packet inter-arrival time, packet size and so forth.

The information amount calculation part 102 calculates an information amount that serves as in index indicating how well time series data is suited for extraction of a characteristic pattern.

The input information selection part 103 selects at least one item of time series data based on the information amount of each time series data.

The model creation part 104 analyzes the time series data of communication traffic selected by the input information selection part 103 and creates (learns) a probabilistic state transition model for representing a pattern(s) and a transition(s) thereof in the time series data. Further, each part of the traffic analysis apparatus 100 may be configured as a separate unit connected via communication means.

Figure 3:
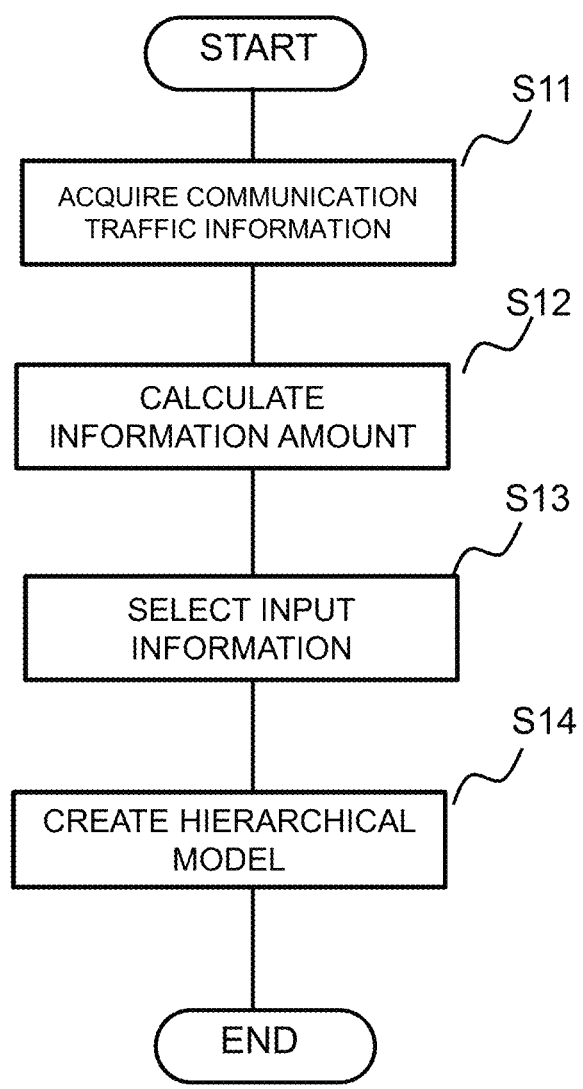
FIG. 3 is a flowchart illustrating a processing procedure of the example embodiment 1 of the present invention.

FIG. 3 is a flowchart illustrating a traffic analysis method according to the example embodiment 1. FIG. 3 is also a diagram illustrating a processing operation of the traffic analysis apparatus 100 illustrated in FIG. 2.

Communication traffic is observed, and with respect to communication traffic of an observation target, a plurality of items of time series data (of multiple types having different attributes from each other) having a common time axis are acquired with respect to the communication traffic (S11). The plurality of time series data may have a common time axis, and the same sampling time and sampling period. Alternatively, when each piece of sampled data in the time series data is an average value using a time window, a start time and a length of the time window may be the same for the plurality of items of time series data. The time window may be a sliding window that slides over the time axis in a predetermined time unit. The length of the time window (sliding window) may be a predetermined time unit.

The information amounts (criteria indicating the ease of extracting a characteristic pattern from time series data) of the plurality of items of time series data of communication traffic are acquired (S12).

At least one item of time series data to be analyzed is selected based on the information amounts of the time series data of communication traffic (S13).

The selected time series data of communication traffic is analyzed, and a probabilistic state transition model for representing a pattern(s) and a transition(s) thereof in the time series data is created (learned) (S14).

Next, each part illustrated in FIG. 2 will be described.
<Communication Traffic Observation Part>

As time series data of communication traffic, the communication traffic observation part 101 may acquire the following:
  throughput [bps (bit per second)],
  packet inter-arrival time (mean value) per unit time [sec],
  average packet size (mean value) per unit time [bytes],
  the number of packets per unit time, and so forth.
Alternatively, for example, the communication traffic observation part 101 may acquire time series data of time-series input information for IoT (e.g., time-series information of an acceleration, a change in wireless quality, etc.).

It is assumed that time series data of a throughput of communication traffic $x=\{x(1), \ldots, x(N)\}$, time series data of a packet size $y=\{y(1), \ldots y(N)\}$, and time series data of a packet transmission interval (reception interval) $z=\{z(1), \ldots, z(N)\}$ are time-synchronized. That is, i-th elements $x(i), y(i),$ and $z(i)$ are a throughput rate, packet size, and packet transmission (reception) interval sampled (or processed statistically, such as averaged over a same period) at the same timing (or in the same period).

The communication traffic observation part 101 may be configured by a packet capture (packet monitor) that captures a packet (frame) which is a protocol data unit (PDU) flowing through a network, and analyzes a header of each packet to look at, for example, a source address, a destination address, a port, a length (packet size), a packet frequency, a packet transmission time interval (packet reception time interval), and so forth. It is noted that a PDU is referred to as a "frame" and a "packet" at the data link layer (layer 2 (L2)) and the network layer (layer 3 (L3)), respectively, of the OSI (Open Systems Interconnection) reference model of the ISO (International Organization for Standardization).

Figure 4A:
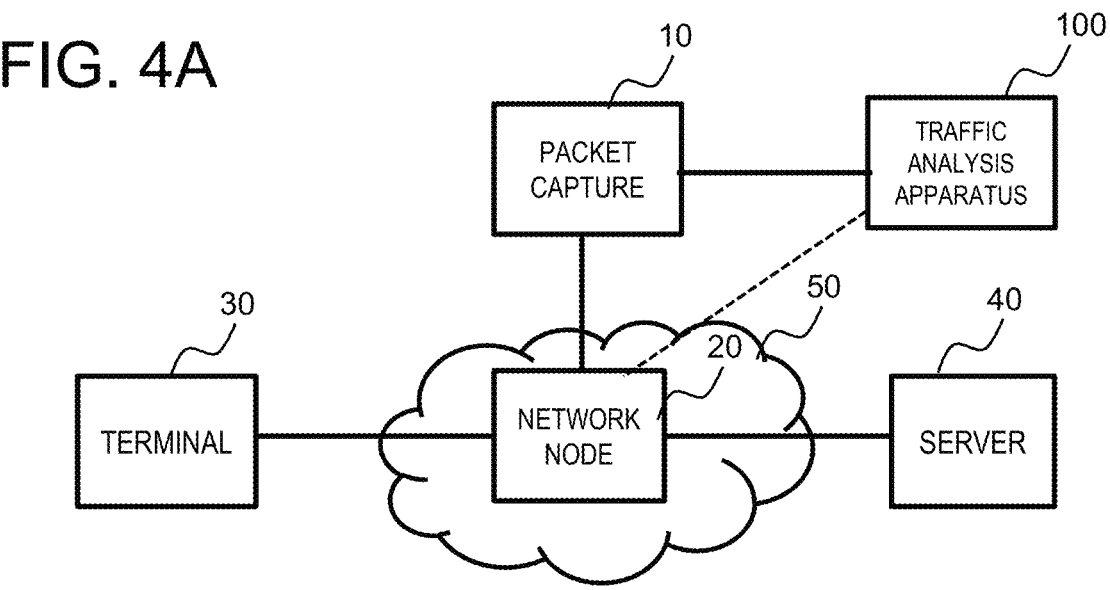
FIGS. 4A to 4C are diagrams illustrating examples of system configurations according to an example embodiment.
Figure 4B:
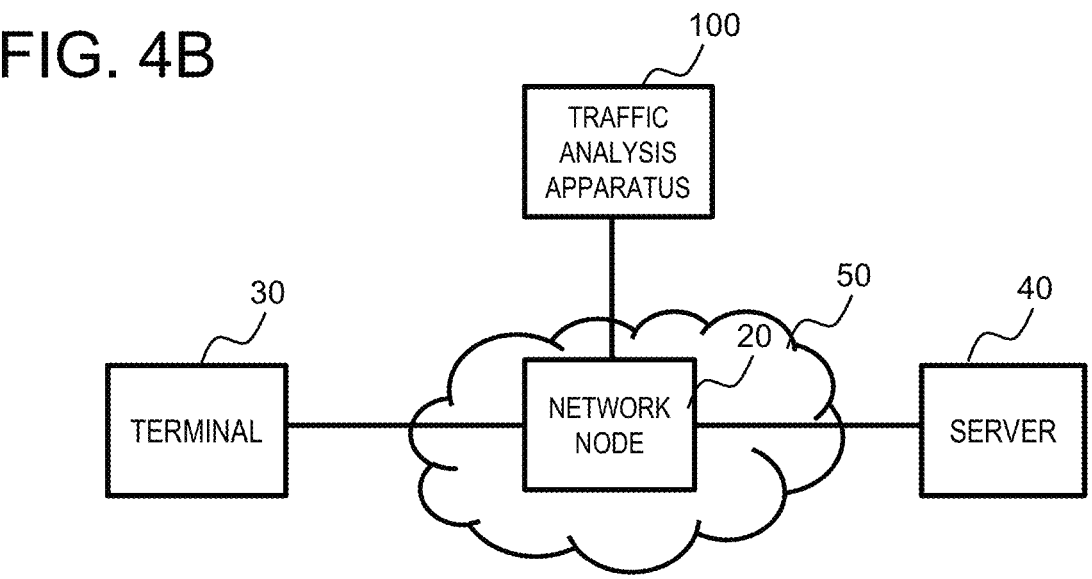
Figure 4C:
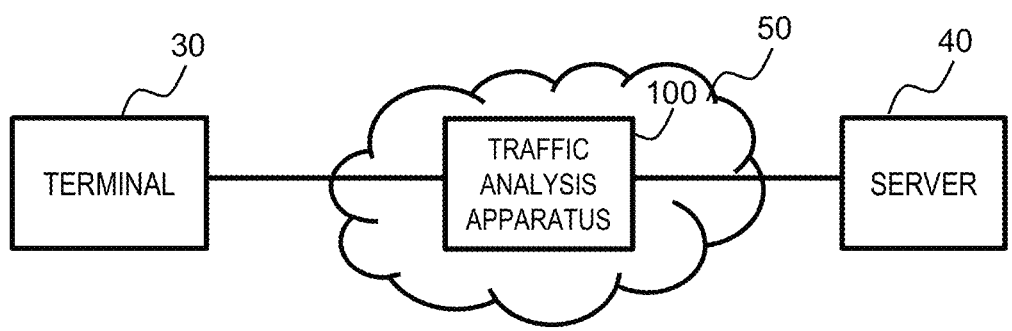

FIGS. 4A, 4B, and 4C are diagrams illustrating communication systems each including a traffic analysis apparatus 100. As illustrated in FIG. 4A, a packet capture 10 (also referred to as "packet monitor") connected to a network node 20 (e.g., a relay apparatus such as a router (L3 switch)) provided within a communication network 50 captures a packet flowing through the communication network 50, for example packets exchanged between a terminal 30 and a server 40. By having the network node 20 copy one or more monitoring target ports (source ports) to a port (a copied port) to which the packet capture 10 is connected, the packet capture 10 is able to monitor all the packets (transmitted and received packets) passing through these ports (source ports) of the network node (switch) 20. In the packet capture 10, a network interface card (NIC) thereof is set to a promiscuous mode so that signals that are not data packets destined the NIC can be captured by the NIC. The packet capture 10 only needs to refer to a packet destination, a source IP address and so forth. Therefore, the communication traffic including a request header and the like may be encrypted.

In FIG. 4A, the network node 20 may be a gateway node in a core network or a base station in a radio access network, for example. A traffic analysis apparatus 100 acquires the time series data of communication traffic (throughput) between a terminal and a server or between terminals calculated by the packet capture 10 and analyzes the traffic. This traffic analysis apparatus 100 corresponds to the traffic analysis apparatus 1 in FIG. 31. The traffic analysis apparatus 100 may be implemented on a cloud server or the like (not illustrated) connected via the communication network 50. FIG. 4B illustrates a configuration in which the packet capture 10 in FIG. 4A is implemented in the traffic analysis apparatus 100 and the packet capture 10 and the traffic analysis apparatus 100 are implemented integrally. Alternatively, as illustrated in FIG. 4C, the packet capture 10 and the traffic analysis apparatus 100 may be implemented on a node in the communication network 50 (for example, a relay apparatus such as a router, a radio base station, a Mobile Edge Computing (MEC) server, a gateway or a server on a core network, etc.). Alternatively, by implementing the packet capture 10 and the traffic analysis apparatus 100 on the terminal 30 or the server 40 communicating with the terminal 30, the packets that flows to the terminal 30 or the packets that are transmitted from the terminal 30 to the server 40 may be captured, and the traffic may be analyzed. In FIGS. 4A to 4C, the communication network 50 may provide the voice telephone call service (Voice Over IP, for example) between terminals.

<Information Amount Calculation Part>

The information amount calculation part 102 calculates information amount with respect to time series data of throughput x={x(1), . . . , x(N)}, time series data of a packet size y={y(1), . . . y(N)}, and time series data of a packet transmission interval (reception interval) z={z(1), . . . , z(N)} of the communication traffic monitored by the communication traffic observation part 101.

Figure 5A:
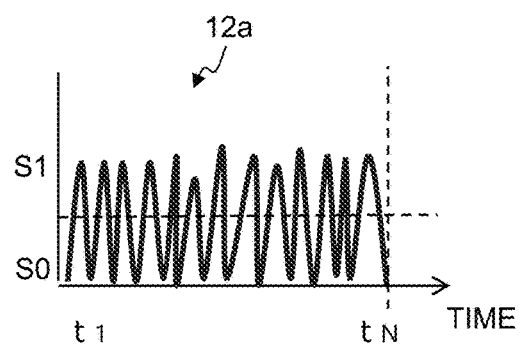
FIG. 5A is a diagram for explaining an entropy of time series data.
Figure 5A:
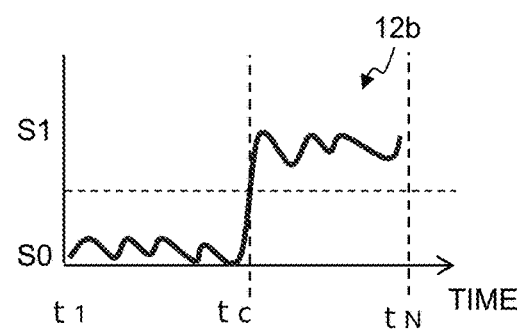

In time series data 12a illustrated in FIG. 5A, it is difficult to detect a changing point, i.e. where a state transition point is. In time series data 12b in FIG. 5A, a pattern changes at a time $t_c$ and it is clear where the state transition point (changing point) is.

As a complexity of time series data increases, an application state changing point becomes more unclear, making it difficult to infer an application state. It is difficult to extract a pattern changing point from the time series data 12a in FIG. 5A, which is preferably not to be selected when inferring an application state therefrom.

Contrary to this, it is easy to extract a pattern changing point from the time series data 12b in FIG. 5A, which is preferably selected when inferring an application state therefrom.

In information theory, entropy is used as an index of ease of data compression, i.e. ease of mining. Given a probability distribution P, an information amount selected for each event A ∈ Ω: an expected value of $-\log_2 P(A)$:

$$H(P) = -\sum_{A \in \Omega} P(A)\log_2(P(A)) \quad (1)$$

is termed an average information amount (entropy) of P.

When a random variable X having a value in a finite set {$x_1$, . . . , $x_N$} follows the probability distribution P, the entropy H(X) of X is given by the following equation.

$$H(X) = -\Sigma_{i=1}^{N} p(X=x_i)\log_2(p(X=x_i))$$

$$\Sigma_{i=1}^{N} p(X=x_i) = 1 \quad (2)$$

The entropy H(X) above is not suited to selection of time series data (e.g., data in which characteristics change with time).

The entropies H(X) of the time series data 12a and 12b in FIG. 5A may be the same or a difference thereof may be small if there is any. For example, let's assume that in the time series data 12a and 12b in FIG. 5A, a state takes a binary value (s0 and s1). In this case, the time series data 12a (sampled data {$x_1$, . . . , $x_N$} at timings $t_1$ to $t_N$) almost alternately takes values corresponding to the states s0 and s1. That is, since a frequencies of the states s0 and s1 are almost the same, an occurrence probability p(s0) of s0 is ½ and an occurrence probability p(s1) of s1 is also ½. Therefore, $$H(X) = -(1/2)\log_2(1/2) - (1/2)\log_2(1/2) = \log_2(2) = 1 \quad (3)$$

In the time series data 12b (sampled data {$y_1$, . . . , $y_N$} at the timings $t_1$ to $t_N$), the values at the timings $t_1$ to $t_c$ ($t_c$ is a state changing point; 1<c<N) correspond to the state s0, and those at the timings $t_c$ to $t_N$ correspond to the state s1. An occurrence probability p(s0) of s0: p(s0)=c/N, and An occurrence probability p(s1) of s1: p(s1)=1−c/N. Therefore, the entropy is given as follows.

$$H(X) = -(c/N)\log_2(c/N) - (1-c/N)\log_2(1-c/N) \quad (4)$$

Here, when assuming that c/N≈1/2, the entropy H(X) of the time series data 12b is H(X)≅1. The entropies H(X) of the time series data 12a and 12b may be the same or a difference therebetween may be small if there is any. Therefore, the difference in pattern between the time series data 12a and 12b cannot be effectively detected using the entropy H(X).

In order to quantitatively evaluate an amount of occurrence (frequency) of similar patterns in time series data, the present example embodiment uses sample entropy (SampEn), a value of which decreases when many similar patterns appear and increases when similar patterns hardly appear. The sample entropy is used as an index for assessing a complexity of a time series.

Figure 5B:
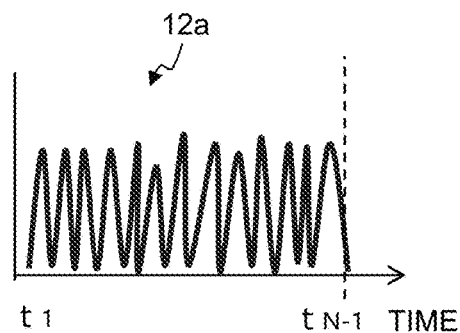
FIG. 5B is a diagram for explaining a sample entropy of time series data.
Figure 5B:
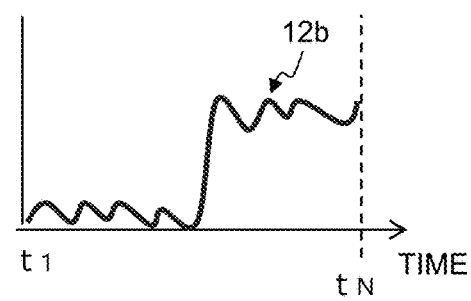

Time-series data 12a and 12b in FIG. 5B are identical to the time series data 12a and 12b in FIG. 5A. The sample entropy (SampEn) of the time series data 12a is large, and the sample entropy (SampEn) of the time series data 12b is small. The input information selection part 103 selects the time series data 12b having a small sample entropy (SampEn).

Figure 6:
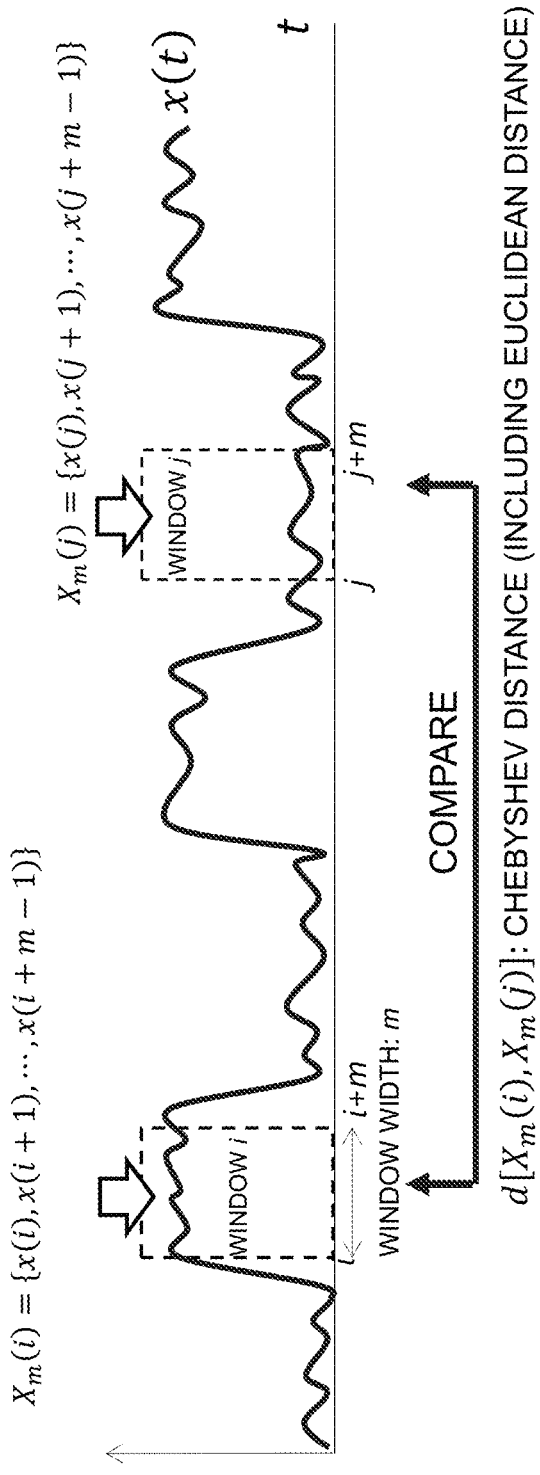
FIG. 6 is a diagram for explaining a sample entropy of time series data.

FIG. 6 is a diagram for explaining the sample entropy (SampEn). A sliding window is used to calculate an index indicating how many times similar patterns repeatedly occurs in observed time series data. It is noted that a length (m) of the sliding window is fixed in FIG. 6. The sliding window moves on a time axis by a predetermined time step (which may include a unit time).

<Step 1>

Time-series data (also referred to as "template vectors") of windows i and j are given by the following equations (5) and (6).

$$X_m(i) = \{x(i), x(i+1), \ldots, x(i+m-1)\} \quad (5)$$

$$X_m(j) = \{x(j), x(j+1), \ldots, x(j+m-1)\} \quad (6)$$

It is assumed that each element is sampled at a constant time τ.

A Chebyshev distance between them $$d(X_m(i), X_m(j)) \quad (7)$$

is calculated.

A Chebyshev distance is given as follows.

$$d(X_m(i), X_m(j)) = \max_{k=0, \ldots, m-1}(|x(i+k) - x(j+k)|) \quad (8)$$

It is noted that, in addition to the Chebyshev distance, an Euclidean distance may also be used.

$$d(X_m(i), X_m(j)) = \sqrt{\sum_{k=0}^{m-1}(x(i+k) - x(j+k))^2} \quad (9)$$

⟨Step 2⟩ (10)

$$d(X_m(i), X_m(j)) < r$$

The number of times (the number of template vector pairs) the above occurs is counted (r is a threshold value for determining similarity). The steps 1 and 2 are performed with lengths m+1 and m.

$$d(X_m(i), X_m(j)) < r \quad (11)$$

Let the number of times (the number of template vector pairs) the above occurs be A, $$d(X_{m+1}(i), X_{m+1}(j)) \leq r \tag{12}$$

and let the number of times (the number of template vector pairs) the above occurs be B.

The sample entropy is given by the following equation (13).

$$SampEn = -\log\left(\frac{A}{B}\right) \tag{13}$$

A is less than or equal to B according to the definition of A. Therefore, the value of SampEn is a non-negative value (0 or positive value). A small SampEn value indicates that the time series data has a high self-similarity or low noise. Self-similar time series data has a structure in which fluctuation patterns are convoluted with multiple periodicities corresponding to a time scale. r is determined based on, for example, a standard deviation of time series data.

<Input Information Selection Part>

The input information selection part 103 in FIG. 2 may select time series data having the smallest sample entropy (SampEn) value as calculated by the information amount calculation part 102 from a plurality of items of time series data acquired by the communication traffic observation part 101.

Alternatively, the input information selection part 103 may select a plurality of items of time series data such as ones having the two smallest sample entropy (SampEn) values as calculated by the information amount calculation part 102 from a plurality of items of time series data acquired by the communication traffic observation part 101.

Alternatively, the input information selection part 103 may select all items of time series data having a sample entropy (SampEn) value calculated by the information amount calculation part 102 not more than a predetermined threshold value from a plurality of items of time series data acquired by the communication traffic observation part 101.

Alternatively, from a plurality of items of time series data acquired by the communication traffic observation part 101, the input information selection part 103 may always select a particular time series data and also select as at least one other time series data, time series data having the smallest sample entropy (SampEn) value from the plurality of items of time series data.

Figure 1:
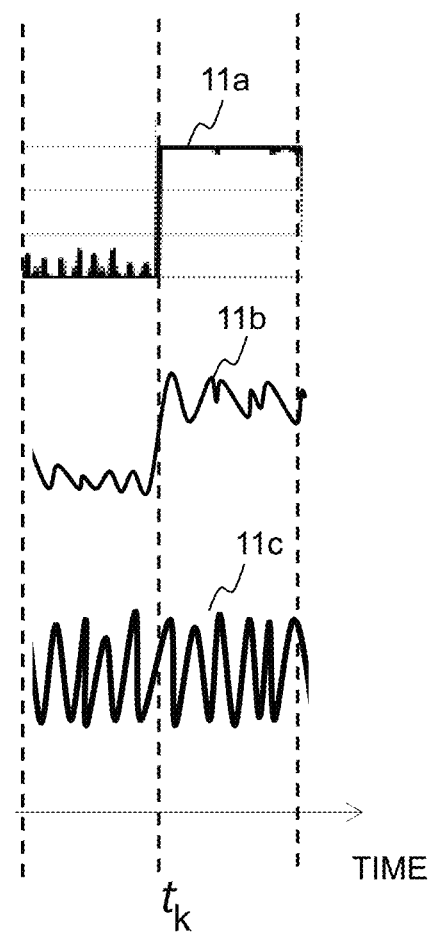
FIG. 1 is a diagram illustrating examples of time series data.

For example, in FIG. 1, the input information selection part 103 may always select the throughput time series data 11a, calculate the sample entropies of the time series data of the packet data size and packet inter-arrival time, and select the time series data of the packet data size along with the throughput data, by excluding the time series data of the packet inter-arrival time which has a sample entropy larger than a threshold value.

<Model Creation Part>

The model creation part 104 in FIG. 2 analyzes time series data selected by the input information selection part 103, creates a probabilistic state transition model for representing a pattern(s) and a transition(s) thereof in the time series data, and stores the model in a storage part 105. The created model is used to infer (estimate) a transition(s) of an application state of the communication traffic based on the time series data of communication traffic selected by the input information selection part 103. An application relating to communication traffic may be a source of the communication traffic (or may be an application cooperating with the source and involving in reception of the communication traffic transferred from the source).

The probabilistic state transition model may be a hidden Markov model discussed later. When modelling a state transition(s) in the time series data of communication traffic selected by the input information selection part 103 using a state transition model that utilizes a hidden Markov model (HMM), the model creation part 104 may group a plurality of hidden Markov states corresponding to similar fluctuation patterns of the time series data into a group and configure a hierarchical model that represents the plurality of collected hidden Markov states as a state in a upper layer hidden Markov model immediately above the hidden Markov model.

The hierarchical model may be configured to include a continuous HMM and an upper layer discrete HMM (output is a discrete value) which is immediately above the continuous HMM.

The model creation part 104 may create a hierarchical model that represents outputs of a plurality of hidden Markov states grouped in a continuous HMM, by using an output probability (e.g., any value from 0.0 to 1.0) of a hidden state of a discrete HMM into which the plurality of hidden Markov states of the continuous HMM are grouped. That is, the hierarchical model may represent transitions of the output of the plurality of hidden Markov states of the continuous HMM by a self-transition probability and an output probability of the hidden state of the discrete HMM.

Figure 7A:
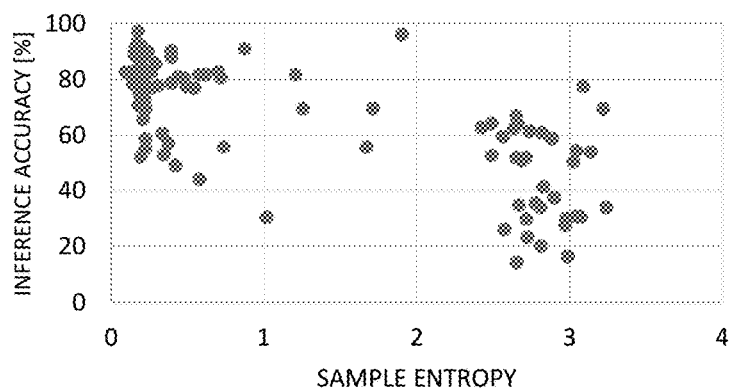
FIG. 7A is a diagram illustrating a relationship between a sample entropy and an accuracy of inference of an application state.

FIG. 7A is a diagram illustrating the relationship between a sample entropy (SampEn) and an inference accuracy of application state. In a scatter plot of FIG. 7A, a horizontal axis is the sample entropy and a vertical axis is the application state inference accuracy (%).

Figure 7B:
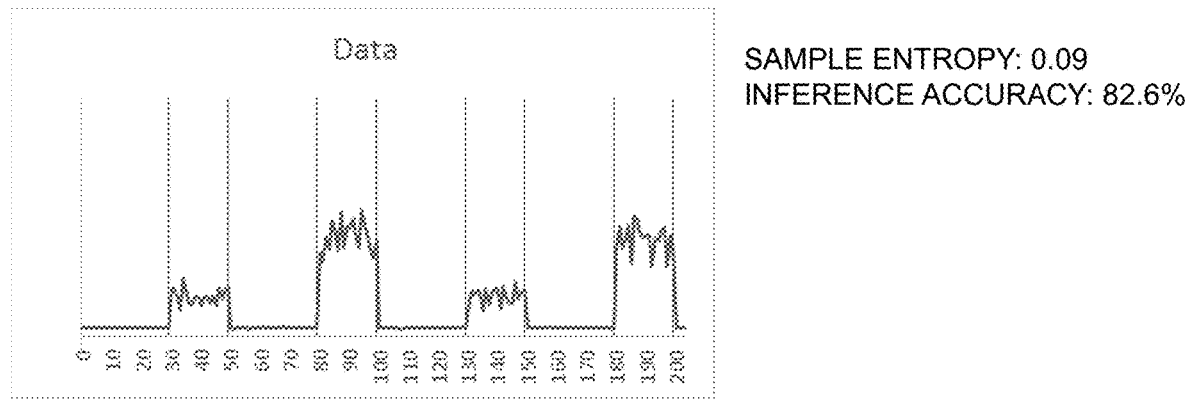
FIGS. 7B and 7C are diagrams illustrating a sample entropy and an application state inference accuracy of time series data.
Figure 7C:
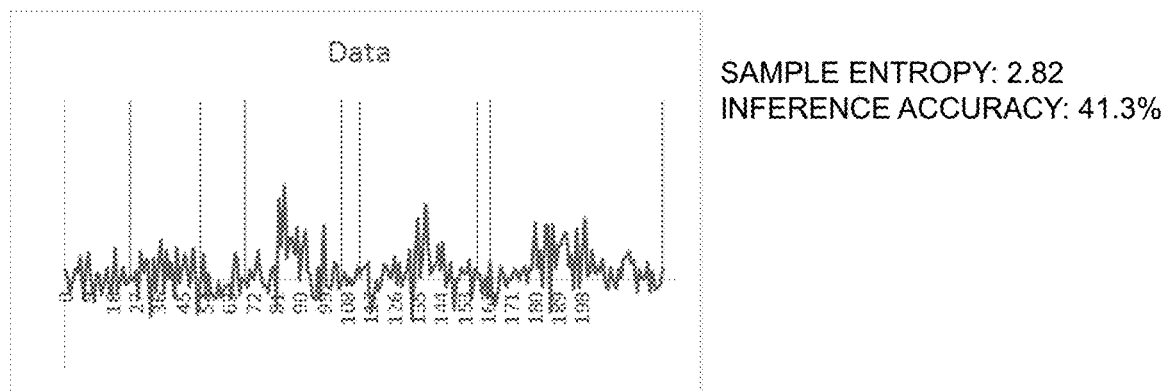

FIG. 7B is a diagram illustrating time series data (sample entropy (SampEn)=0.09, an inference accuracy of an application state=82.6%). FIG. 7C is a diagram illustrating another time series data (sample entropy=2.82, an inference accuracy of an application state=41.3%). From these diagrams, it is confirmed that time series data with a smaller sample entropy value has a higher application state inference accuracy.

Figure 18:
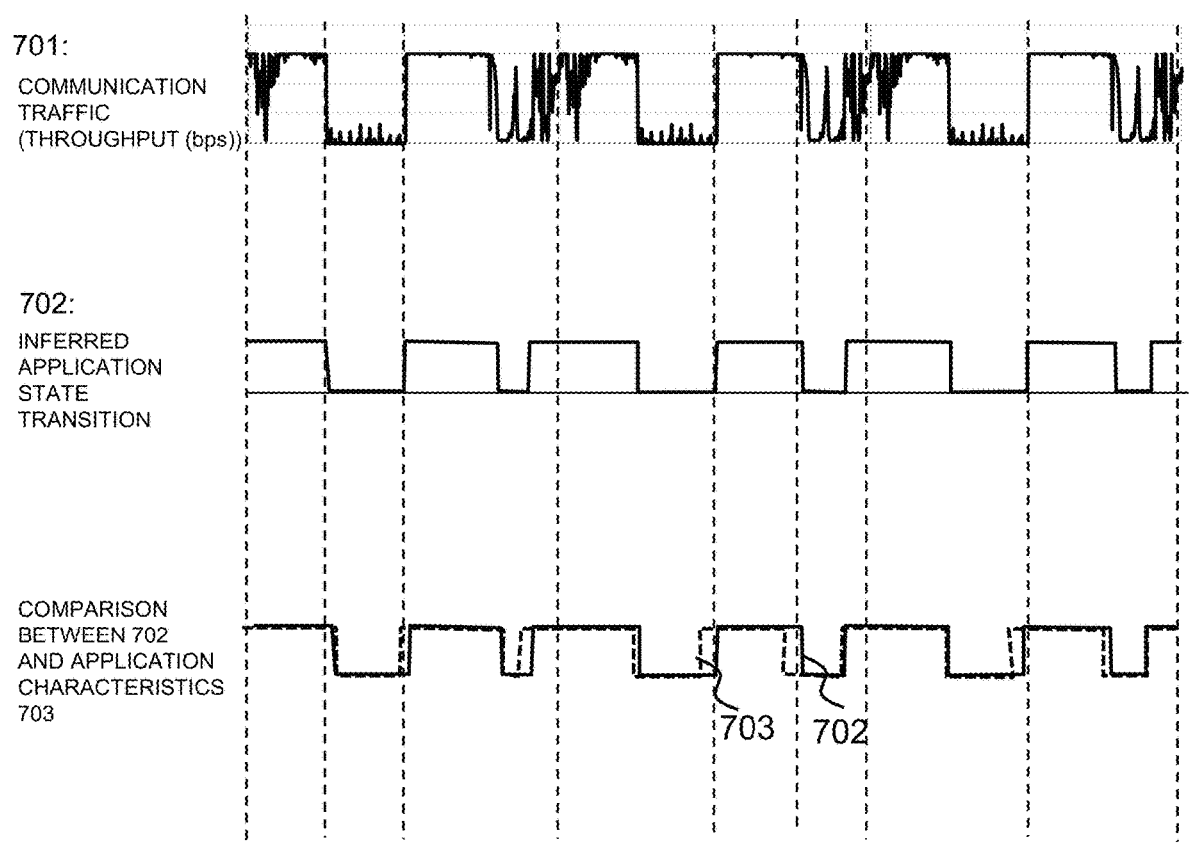
FIG. 18 is a diagram for explaining the processing of an application state determination part of the example embodiment 4 of the present invention.

As illustrated in FIG. 18 which will be referred to in the description of another example embodiment below, the inference accuracy of an application state may be calculated by calculating a cross-correlation function (similarity) between a sequence 703 registered in advance which is a sequence of transitions in an application with state transitions being known and a sequence 702 of transitions of an application state inferred based on a hierarchical HMM for time series data 701 of communication traffic corresponding to the known application state. When the cross-correlation coefficient is 1, i.e. a perfect match, an inference accuracy is 100%.

Figure 8A:
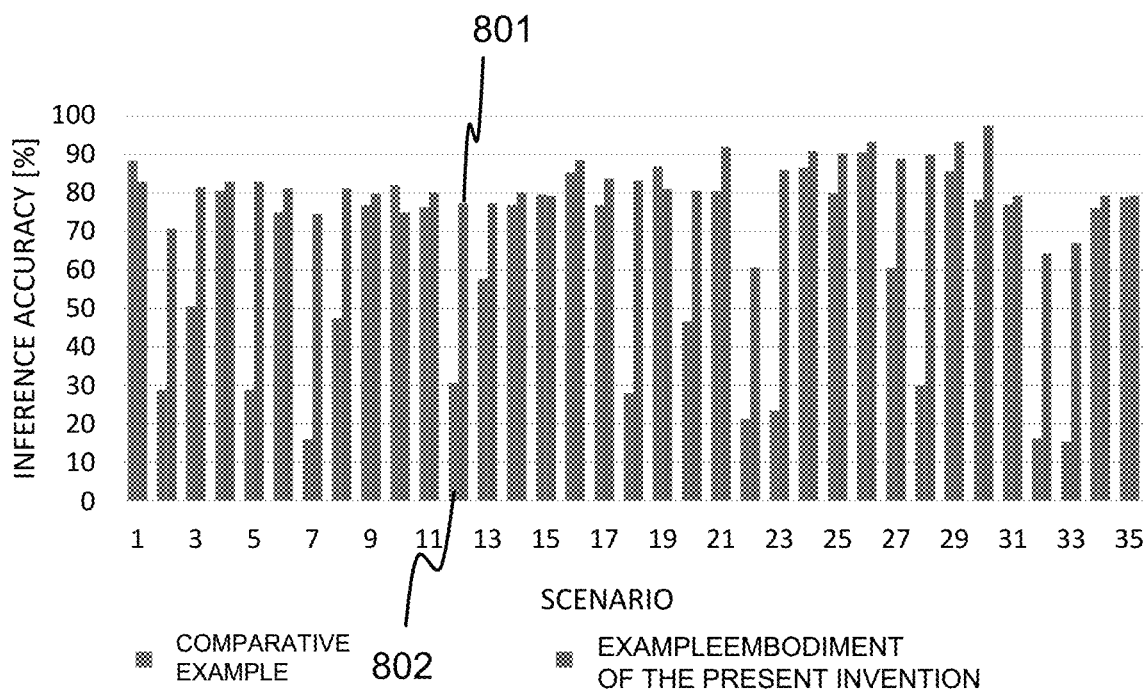
FIG. 8A is a diagram illustrating an inference accuracies of a comparative example and an example embodiment in each scenario.

FIG. 8A is a diagram illustrating contrast of accuracies of inference of an application state from communication traffic between an example embodiment of the present invention and a comparative example. In this comparative example, the information amount calculation part 102 and the input information selection part 103 in FIG. 2 are not provided, and a model is created based on a plurality of items of time series data (of multiple types) acquired by the communication traffic observation part 101. FIG. 8A illustrates accuracies of inferring an application state from communication traffic in the example embodiment and the comparative example in each of a plurality of different scenarios (use cases) 1 to 35. In FIG. 8A, a horizontal axis is a scenario (use case) number, and a vertical axis is an application state inference accuracy. For each scenario, a left bar (e.g., 802 of scenario 12) is an application state inference accuracy of the comparative example, and a right bar (e.g., 801 of scenario 12) is an application state inference accuracy of the example embodiment of the present invention. It is noted that the scenarios (use cases) are categorized according to an application such as smartphone, IoT device, etc.

Figure 8B:
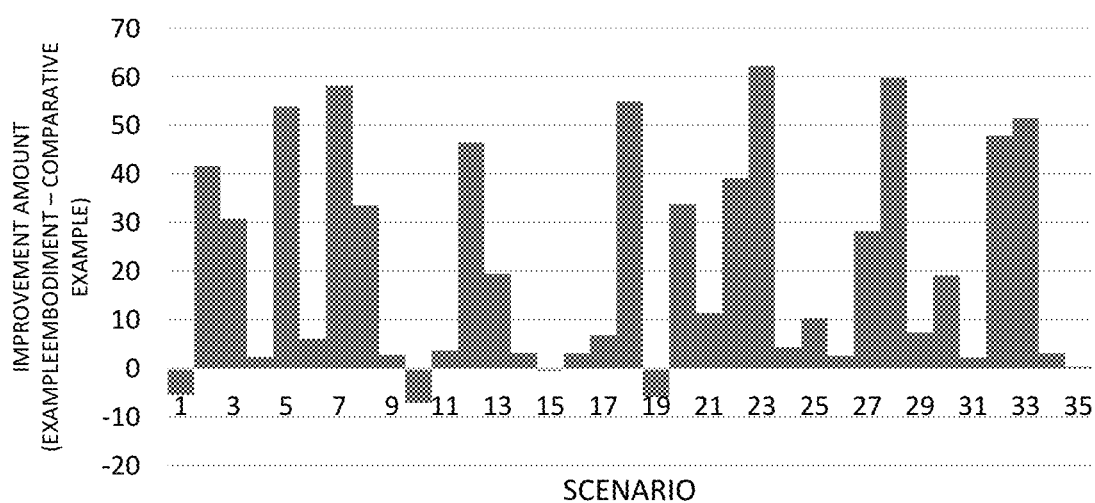
FIG. 8B is a diagram illustrating a difference (amount of improvement) obtained by subtracting an inference accuracy of a comparative example from an inference accuracy of the example embodiment illustrated in FIG. 8A.

FIG. 8B is a diagram illustrating values obtained by subtracting the application state inference accuracies of the comparative example from the application state inference accuracies (e.g., 801) of the example embodiment of the present invention illustrated in FIG. 8A. The scenario 12 in FIG. 8B corresponds to a value obtained by subtracting the value of 802 from that of 801 in FIG. 8A. As shown in FIG. 8B, the application state inference accuracy of the example embodiment of the present invention is better in most of the 35 scenarios, and there are more than seven scenarios, in which the example embodiment is better by 50 percent or more. From above, effectiveness of the present invention in inferring an application state from communication traffic has been confirmed.

Example Embodiment 2

Figure 9:
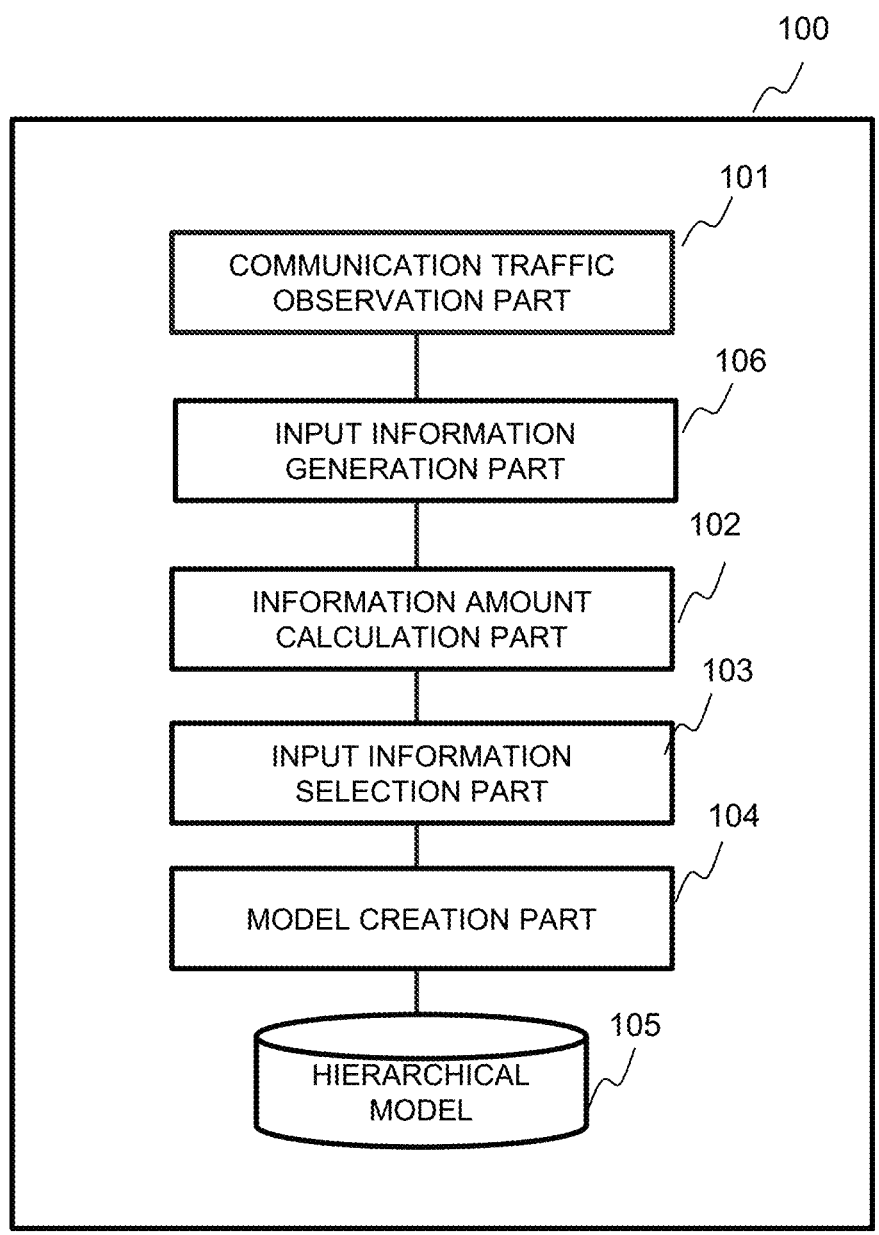
FIG. 9 is a diagram illustrating a configuration example of an example embodiment 2 of the present invention.

FIG. 9 is a diagram illustrating an example embodiment 2 of the present invention. Referring to FIG. 9, an input information generation part 106 is provided in addition to the configuration in FIG. 2. Since the example embodiment 2 is configured identically to the example embodiment 1 in FIG. 2 with regards to other configurations, the following describes the input information generation part 106.

The input information generation part 106 generates new input data utilizing time series data (such as a throughput) of communication traffic acquired by the communication traffic observation part 101 and supplies the data to the information amount calculation part 102. Let time series data of communication traffic be X={x(1), x(2), ..., x(T)}, and time series data generated by the input information generation part 106 Z={z(1), z(2), ..., z(T)}. The input information generation part 106 may generate the time series data Z based on a difference in the time series data X of communication traffic.

$$z(t)=x(t)-x(t-\tau) \qquad (14)$$

Figure 10A:
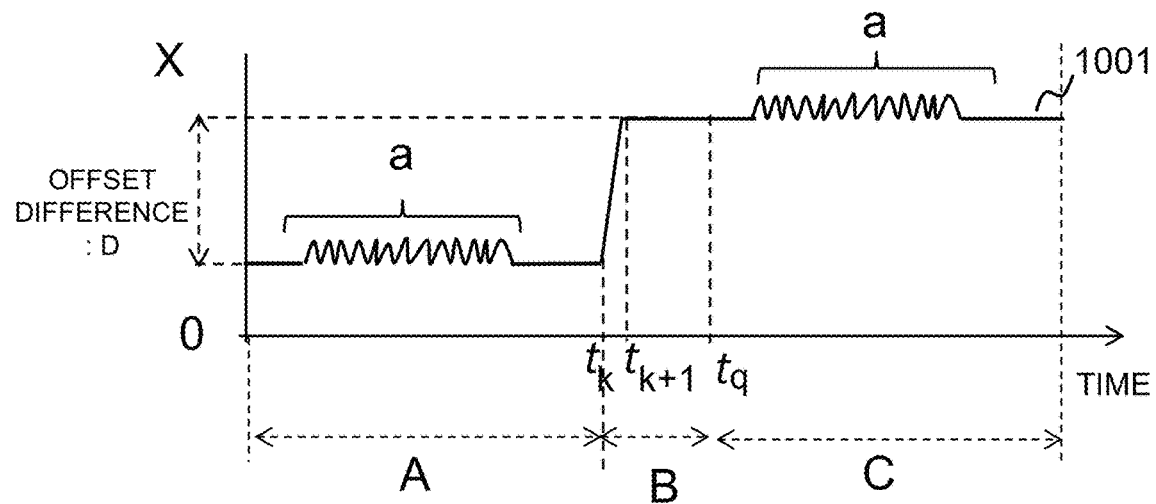
FIGS. 10A and 10B are diagrams schematically illustrating examples of the time series data supplied to an input information generation part and the time series data outputted by an input information generation part.
Figure 10B:
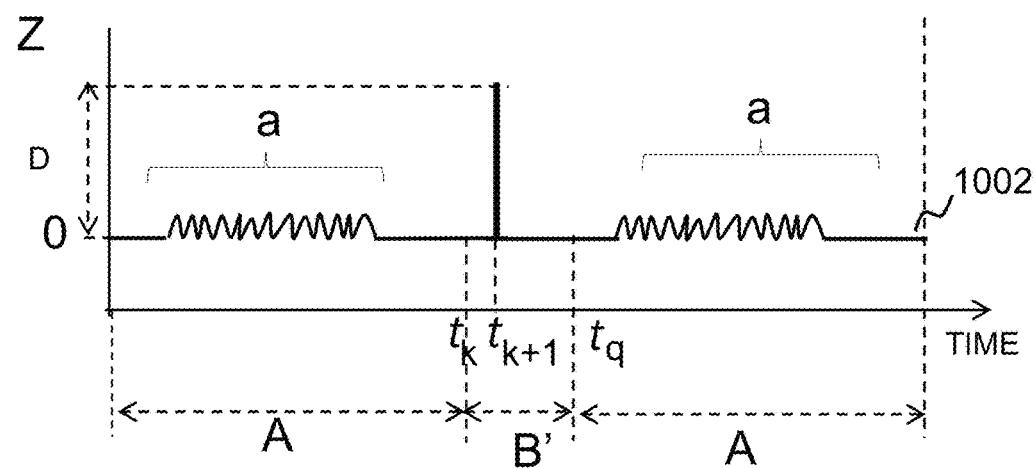

FIG. 10B is a diagram illustrating an example of the time series data Z generated by calculating the differences between adjacent items in the time series data X illustrated in FIG. 10A with τ=1.

$$z(t)=x(t)-x(t-1) \qquad (15)$$

This is a differential filter (high-pass filter), which cuts off direct a current (DC) component. Further, with τ=2, the time series data Z may be obtained by calculating the differences between every other adjacent items in the time series data X.

A time series data 1001 illustrated in FIG. 10A has an offset difference Δ between data x(k) at a sampling time $t_k$ and data x(k+1) at a sampling time $t_{k+1}$. As a result, the model creation part 104 infers that an interval until the time $t_k$ is an application state A, an interval from the time $t_{k+1}$ to $t_q$ is a state B, and an interval after the time $t_q$ is a state C in the time series data 1001 in FIG. 10A, and creates a state transition model in which the state transitions from A→B→C.

A time-series pattern a (fluctuation pattern in the time series data with a DC offset being eliminated) inferred to be the state A in FIG. 10A, is identical to a time-series pattern a (fluctuation pattern in the time series data with the DC offset eliminated) inferred to be the state C in FIG. 10A. If the model creation part 104 creates a model used to infer an application state based on the time series data 1001 illustrated in FIG. 10A, the state specific to the time-series pattern a cannot be accurately inferred.

Then, for example, with τ=1 in Expression (14), if the difference between each adjacent data items of the time series data X is taken, as illustrated in FIG. 10B, a DC level offset D between the states A and C is eliminated in the time series data 1001 in FIG. 10A. A time series data 1002 in FIG. 10B is obtained by eliminating the offset D between the states A and C in the time series data 1001 in FIG. 10A. As a result, the model creation part 104 infers that the interval until the time $t_k$ is the state A, the interval from the time $t_{k+1}$ to $t_q$ is the state B', and the interval after the time $t_q$ is the state A in the time series data 1002, and creates a state transition model in which the state transitions from A→B'→A. Further, in FIG. 10B, the difference z(tk+1)=x(tk+1)−x(tk)=D (offset difference) in the sampled value between the times $t_k$ and $t_{k+1}$ is represented as the value D (glitch-like instantaneous pulse) of Z at the time $t_{k+1}$. Therefore, the model creation part 104 infers that the interval from the time $t_{k+1}$ to $t_q$ is the state B', different from the state B in FIG. 10A. In the state B' in FIG. 10B, a sampled value D (an amplitude (peak value) of the instantaneous pulse) at the time $t_{k+1}$ indicates that the DC level in the time series data changes by D between the times $t_k$ and $t_{k+1}$. For example, the time series data Z in FIG. 10B is effective in an application example in which the characteristics of an AC fluctuation pattern (vibration pattern) are extracted from fluctuation patterns in time series data.

The input information generation part 106 may use a sliding window for the time series data 1001 and calculate window statistics (mean, variance, etc.). For example, with a window width of w as illustrated in FIG. 11A, the moving average is calculated.

$$z'(t) = \frac{1}{w}\sum_{i=0}^{w} x(t+i) \qquad (16)$$

This is a low pass filter (smoothing filter). Time-series data 1102 in FIG. 11B is a diagram illustrating an example of a result of calculating moving averages using a sliding window for time series data 1101 in FIG. 11A. It is noted that, for the sake of simplicity, an amplitude average of the interval of the time-series pattern a (vibration pattern) is set to 0 in FIG. 11A and the value of Expression (16) is set to 0 in FIG. 11B. The transition of a DC level at a time $t_{k+1}$ in FIG. 11A is schematically illustrated in FIG. 11B, as an output waveform of a first-order low-pass filter, as a rising edge of a square wave.

Figure 11A:
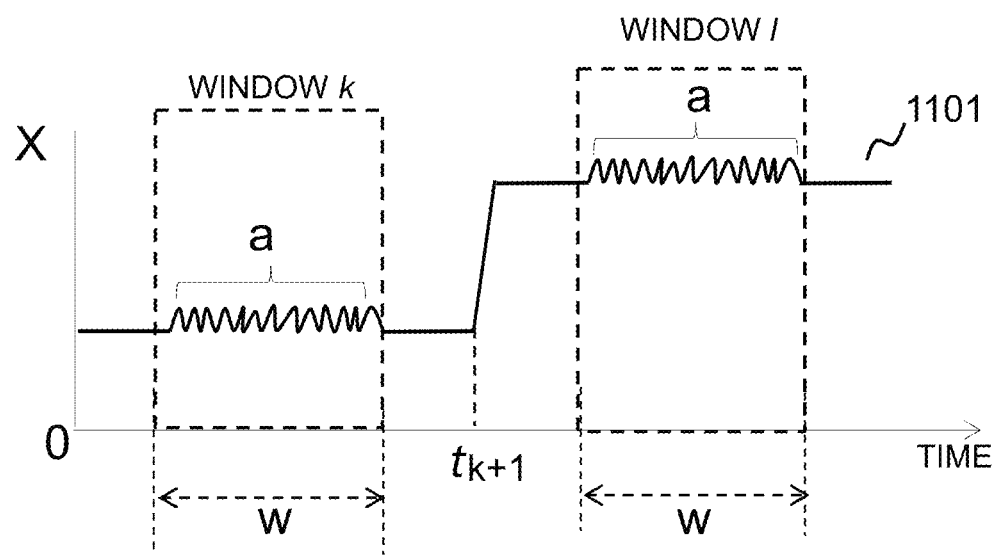
FIGS. 11A and 11B are diagrams schematically illustrating examples of the time series data supplied to the input information generation part and the time series data outputted by the input information generation part.
Figure 11B:
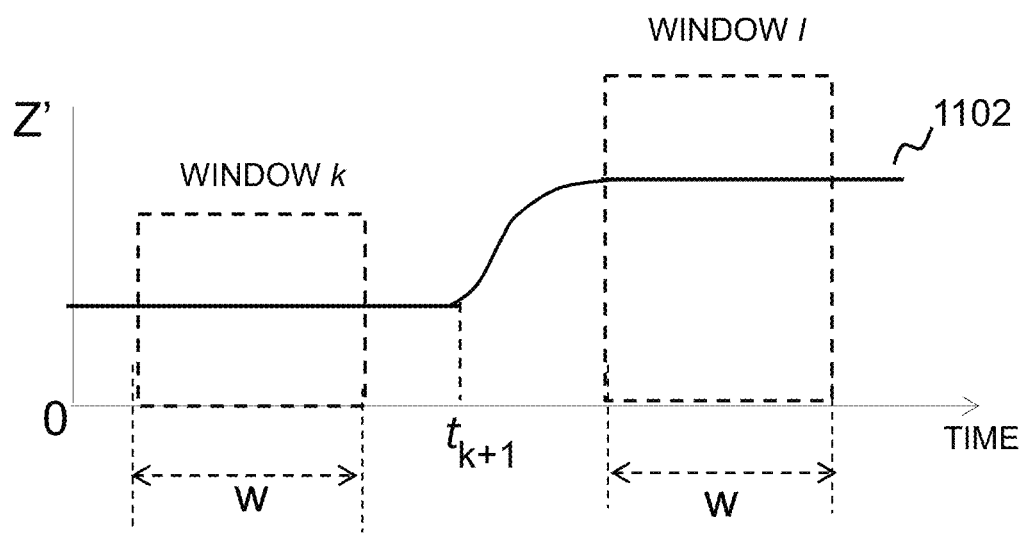

As illustrated in FIG. 11B, the time-series pattern a in FIG. 11A is removed and the DC level change is extracted. This is effective in an application example in which a characteristic of a fluctuation, such as a DC level fluctuation in a time-series pattern is important and an AC fluctuation and random noise are eliminated.

The input information generation part 106 may function as a filter that eliminates communication noise (glitch-like noise, etc.) from time series data (such as the throughput) of communication traffic acquired by the communication traffic observation part 101.

The input information generation part 106 may acquire in advance corresponding noise characteristic parameters of a network environment of traffic to be analyzed. For example, the network environment of traffic to be analyzed may be acquired from the network node 20 in FIGS. 4A and 4B. For example, if the network node 20 is a base station, the network environment will be a wireless network. If the network node 20 is a core network node, the network environment will be a mobile phone network, and if it is an optical router, the network environment will be a fixed line (fixed network). The input information generation part 106 may be configured to generate a noise waveform (time series data), based on a noise characteristic parameter(s), generate new time series data by subtracting the noise waveform (time series data) from time series data of communication traffic, and supply the new time series data to the information amount calculation part 102.

Example Embodiment 3

Figure 12:
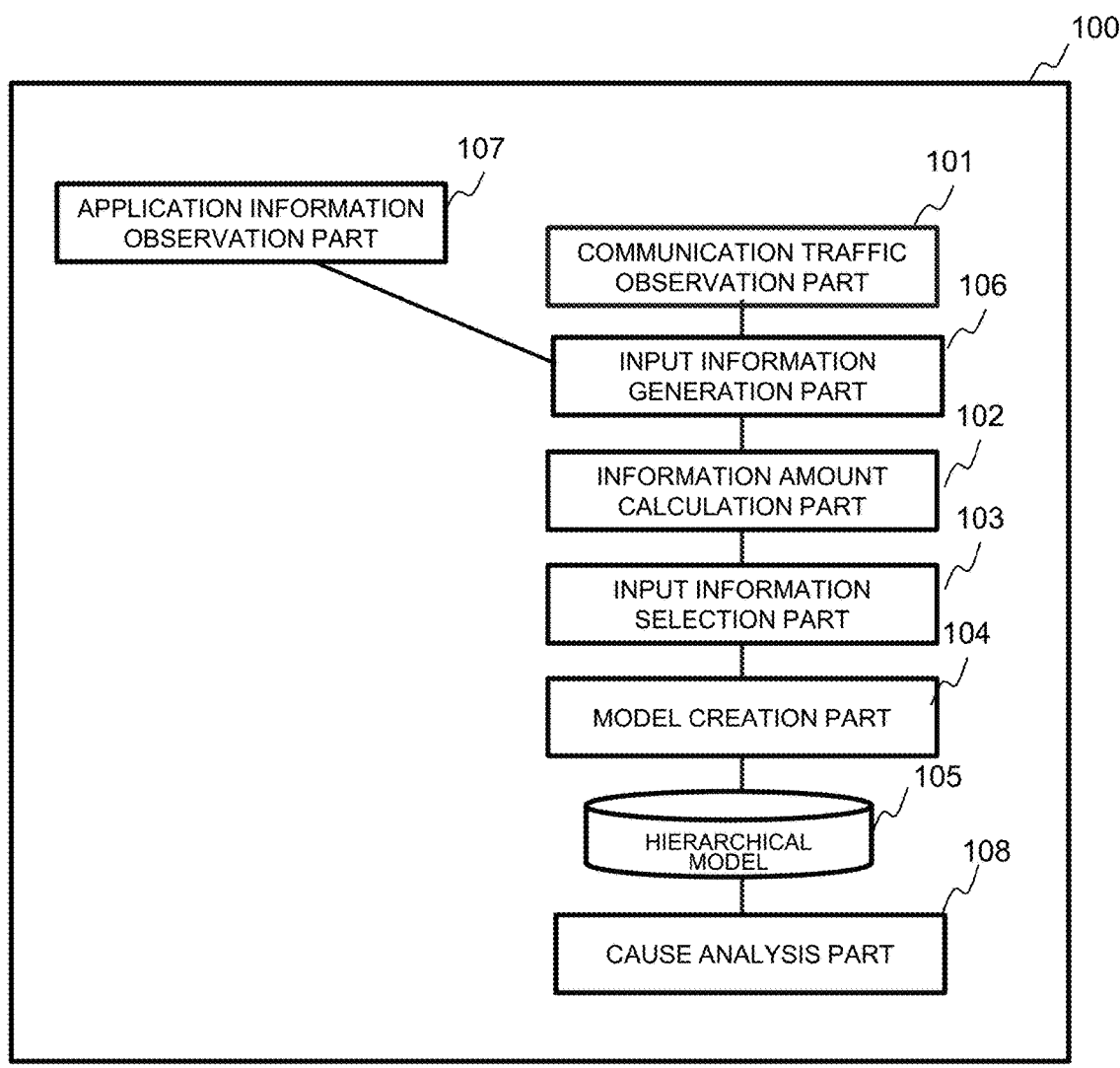
FIG. 12 is a diagram illustrating a configuration example of an example embodiment 3 of the present invention.

FIG. 12 is a diagram illustrating the configuration of a traffic analysis apparatus according to an example embodiment 3 of the present invention. Referring to FIG. 12, the traffic analysis apparatus 100 includes an application information observation part 107 and a cause analysis part 108, in addition to the configuration of the example embodiment 2 in FIG. 9. In FIG. 12, the input information generation part 106 is able to analyze an application state at an application level by receiving application information from the application information observation part 107, in addition to the communication traffic information acquired by the communication traffic observation part 101.

As the information relating to an application level, for example, from an in-vehicle sensor (acceleration sensor that detects acceleration, gyro sensor that detects an angle of the vehicle, etc.), the application information observation part 107 may acquire information indicating whether the vehicle is running (driving) or stopped, a driving mode (idling, acceleration, constant speed, deceleration) if it is driving, and further a steering status such as going straight, turning left, turning right.

The input information generation part 106 extracts a time interval of required time series data and supplies the time interval to the information amount calculation part 102. For example, let's assume that communication traffic is video information (moving images) acquired by a vehicle camera and transmitted to a server in a vehicle automated driving support system. In this case, when the vehicle is parked or stopped, the server may not need all the time series data of the communication traffic during this parking or stopping period for the control of safe driving and automated driving support. In this case, based on application information (indicating that the vehicle is parked or stopped) from the application information observation part 107, the input information generation part 106 may decimate the time series data of the communication traffic by a predetermined time interval or average the time series data of the communication traffic using a sliding window with predetermined time intervals and supply the result to the information amount calculation part 102. If the vehicle is running, the input information generation part 106 may directly supply the time series data of a throughput, etc. of the communication traffic to the information amount calculation part 102 in order to ensure the video quality.

Alternatively, for example, the application information observation part 107 may calculate (assess) QoE (Quality of Experience), which is an application quality (e.g., Web QoE, video QoE, etc.). A QoE value measured by a node (terminal, server, etc.), to which a web site or video is delivered, may be collected and stored in association with an application state, and a QoE value corresponding to communication traffic (throughput) acquired by the communication traffic observation part 101 and to an application state may be derived. For example, the application information observation part 107 assesses QoE of a video (captured by a camera) application to see if the video does not break up, or assesses QoE to be "good" (4 on a 5-point scale) if the video quality is high.

When QoE is evaluated, for example, a 5-point scale (excellent, good, fair, bad, very bad) is used. Further, in a case of a video, the DMOS (Differential Mean Opinion Score) obtained by subtracting the MOS (Mean Opinion Score) of a reference video from the MOS of the assessed video may be used. The MOS of the reference video may be subtracted from the MOS of the assessed video and five may be added to the result (ACR (Absolute Category Rating)-HRR (Hidden Reference Removal)).

Time-series data of an application quality acquired by the application information observation part 107 may be supplied to the model creation part 104 via the input information generation part 106 and the information amount calculation part 102. In this case, the model creation part 104 is able to generate a state transition model that takes into account time series data of the application quality.

Alternatively, the input information generation part 106 that has received the application information (application quality) acquired by the application information observation part 107 may perform arithmetic processing on time series data of communication traffic (e.g., throughput, etc.) corresponding to the application quality based on the application quality and supply the processing result to the information amount calculation part 102. For example, there is a case where it is possible to recognize that an application state is video transmission based on application information acquired by the application information observation part 107 without analyzing time series data of a throughput of communication traffic from the communication traffic observation part 101. At this time, if QoE of a video (camera) application indicates that the video breaks up (QoE: bad), it will be determined that the throughput is decreasing during that period. In this case, the input information generation part 106 may decimate a certain time interval (during which the video breaks up) from the time series data of the throughput of communication traffic provided by the communication traffic observation part 101 for supply to the information amount calculation part 102.

When the application state is inferred to be "A," the cause analysis part 108 analyzes a cause thereof. In a case where the application state is "A" (e.g., video transmission), the video breaks up, and the throughput is estimated to be significantly lower than a normal level of video streaming, when the corresponding application information indicates "a stopped vehicle," the vehicle camera of the stopped vehicle transmitting video at relatively long intervals (e.g., 30 seconds) in intermittent image recording mode and not transmitting video in real time is given as a cause of interrupted video playback and decrease in the throughput.

According to the present example embodiment, by inferring an application state based on an observation result of application information, an application state inference accuracy can be improved. Further, a cause why the application state inferred based on time series data selected is in a certain state can be analyzed based on the observed application information.

Next, the model creation part 104 common to the first to example embodiment 3s will be described. The model creation part 104 creates a hierarchical model of a continuous HMM and discrete HMM as a probabilistic model of state transitions in time series data of communication traffic.

The continuous HMM represents a symbol output probability using a probability density function (PDF) (e.g., Gaussian distribution (Gaussian p.d.f.), and the output of each state is a d-dimensional real-valued vector (d is a predetermined positive integer) according to the probability density function.

Figure 13:
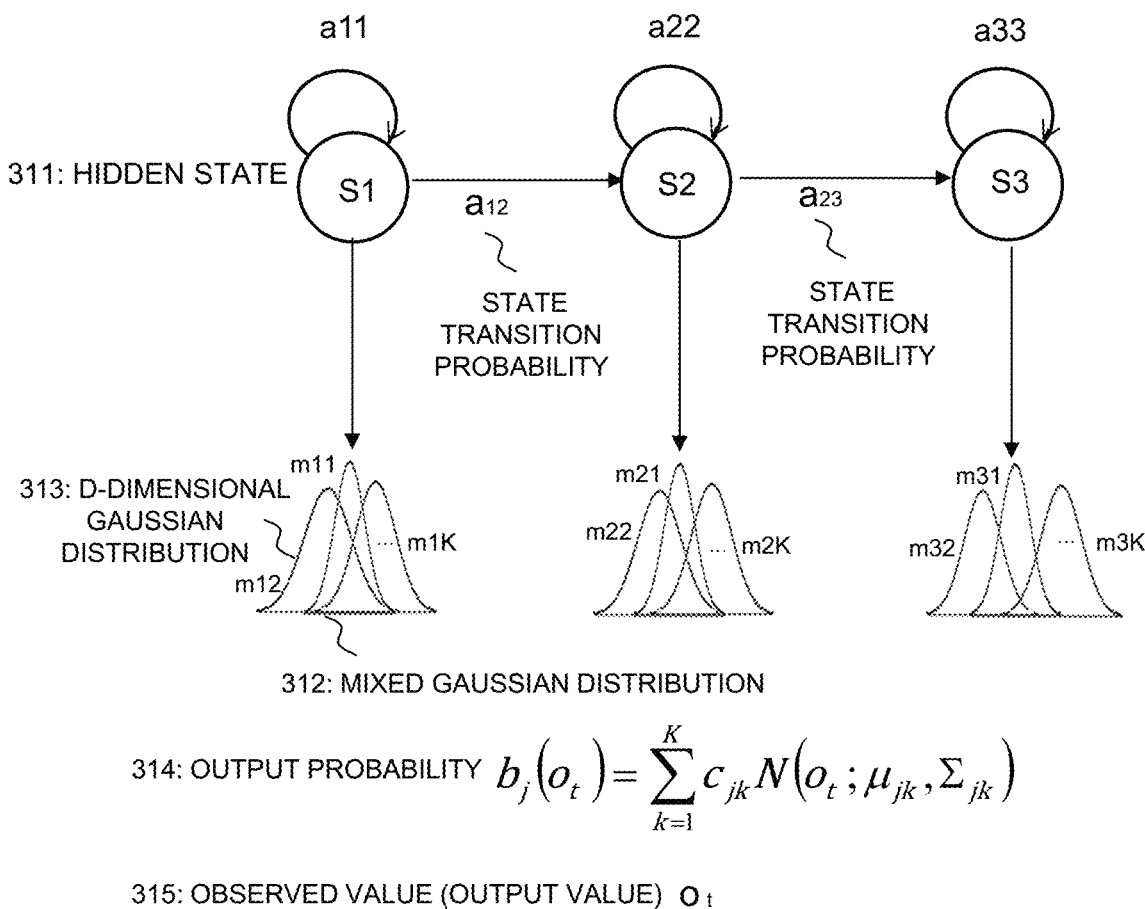
FIG. 13 is a diagram schematically illustrating a continuous mixture HMM.

FIG. 13 is a schematic diagram for explaining the continuous HMM. Referring to FIG. 13, in a continuous HMM, an output of each state constitutes a subspace of the output space (d-dimensional space). The output probability of an individual state of a continuous mixture HMM is given as follows.

An observed value sequence 0 (the communication traffic in FIG. 1) is assumed to be composed by time series data having a sequence length T.

$$O=[o_1, o_2, \ldots, o_T] \qquad (17)$$

where $o_t$ is given by the following d-dimensional column vector ($d \geq 1$).

$$O_t X_1, X_2, \ldots, X_d]^T \qquad (18)$$

The superscript T is a transpose operator.

For example, when three sets of time series data in FIG. 1 are used, d is 3.

The output probability distribution $b_j(o_t)$ in a state j (hidden state) is given as follows.

$$b_j(o_t) = \sum_{k=1}^{K} c_{jk} N(o_t; \mu_{jk}, \Sigma_{jk}) \qquad (19)$$

$$c_{jk} > 0,$$

$$\sum_{k=1}^{K} c_{jk} = 1$$

K is the mixture number of the continuous mixture HMM, and N( ) is a multi-dimensional (d-dimensional) normal distribution.

$$N(o_t; \mu_{jk}, \Sigma_{jk}) = \frac{1}{(2\pi)^{\frac{d}{2}} \cdot |\Sigma_{jk}|^{\frac{1}{2}}} \exp\left[-\frac{1}{2}(o_t - \mu_{ij})^T \cdot \Sigma_{jk}^{-1} \cdot (o_t - \mu_{ij})\right] \qquad (20)$$

In Expression (20), $\mu_{ij}$ is an average, and $\Sigma_{jk}$ is a d×d variance-covariance matrix.

Model parameters of the continuous mixture HMM are as follows.

$$\Theta = \{(\pi_i, a_{ij}, c_{jk}, \theta_{jk}); i,j=1,\ldots,N, I=1,\ldots,K\} \qquad (21)$$

In Expression (21), N is the number of states and K is the mixture number.

$\pi i$ is an initial state probability indicating what is the initial state.

$a_{ij}$ is a transition probability with which the state exists in a state i at time t-1 and transitions to the state j at time t.

$c_{jk}$ is a mixture ratio of the kth probability distribution of the state j.

$\theta_{jk}$ is a parameter of the kth probability distribution of the state j (an average vector $\mu_{jk}$ and a variance-covariance matrix $\Sigma_{jk}$). Namely, $$\theta_{jk} = \{\mu_{jk}, \Sigma_{jk}\} \qquad (22)$$

For example, the model creation part 104 derives model parameters based on an EM (Expectation-Maximization) algorithm.

Let an output (observed data) be x, let non-observed data (missing data) (a state sequence in an HMM) be y, and let model parameters be $\Theta$, in order to maximize a log likelihood of an observed value sequence by repeating an E (expectation) step and an M (maximization) step, the following steps 1 to 3 are included.

<Step 1>

The initial parameter $\Theta$ is set (time t=0).

<Step 2>

Under the currently estimated parameter distribution $\Theta^t$, an expected value with respect to the conditional probability $P(y|x, \Theta^t)$ of the likelihood function is calculated (E step).

$$Q(\Theta|\Theta^t) = \Sigma P(y|x, \Theta^t) \log P(x, y|\Theta) \qquad (23)$$

<Step 3>

A parameter that maximizes the expected likelihood value $Q(\Theta=1\Theta^t)$ derived in E step is derived (M step).

$$\Theta^* = \arg\max<\Theta> Q(\Theta|\Theta^t) \qquad (24)$$

The parameter $\Theta^*$ derived in this M step is used as $\Theta^{(t+1)}$ to update the time (t=t+1), and the above steps 2 and 3 are repeated until the expected value used to determine the distribution of the latent variable used in the subsequent E step converges (stops increasing).

Figure 14A:
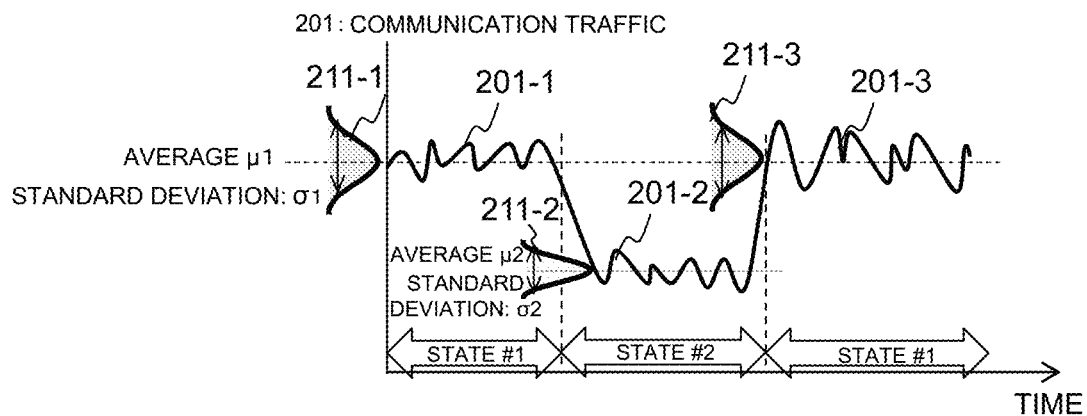
FIGS. 14A, 14B, and 14C are diagrams schematically illustrating time series data and distributions of communication traffic, states (output probability distributions) and state transition probabilities in a continuous HMM, and an inferred state sequence, respectively.
Figure 14B:
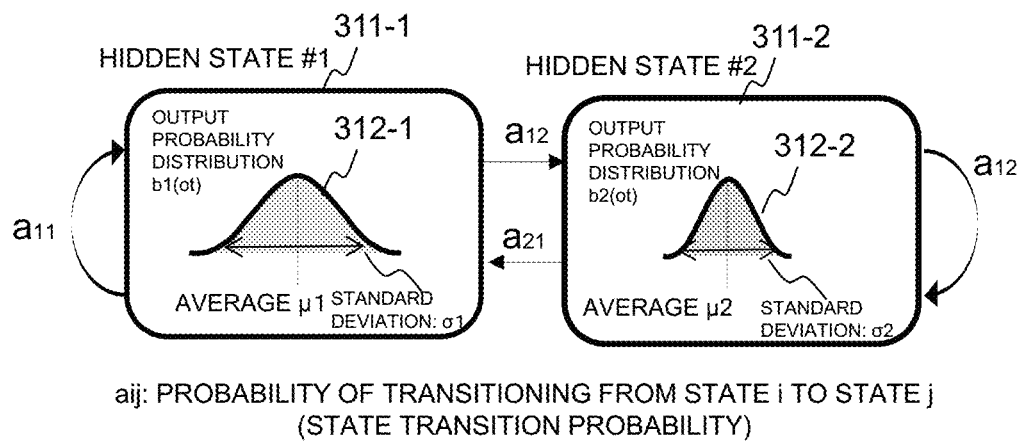
Figure 14C:
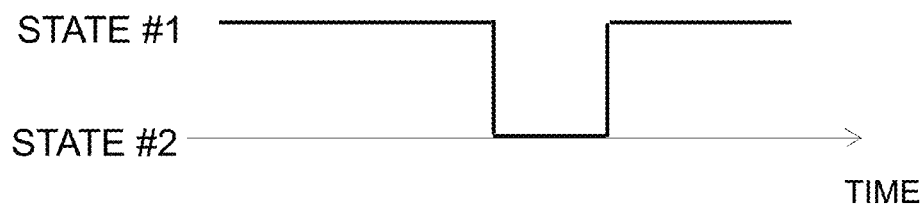

FIGS. 14A to 14C are diagrams illustrating an operation example of the model creation part 104. As schematically illustrated in FIG. 14A, in the continuous HMM, distributions of amplitude values (vertical axis in FIG. 14A) of the time series data 201 (sections 201-1, 201-2, and 201-3) of communication traffic (for example, throughput) are represented as normal distributions 211-1, 211-2, and 211-3 (normal distributions 211-1 and 211-3 are the same distribution). Regarding the distributions of the amplitude values in the sections 201-1 and 201-3 of the time series data, an average is denoted by $\mu_1$ and the standard deviation is denoted by $\sigma_1$. Regarding the distribution of the amplitude values in the section 201-2 of the time series data, the average is denoted by $\mu_2$ and the standard deviation is denoted by $\sigma_2$.

FIG. 14B schematically illustrates a continuous HMM when a single normal distribution corresponds to a single state (for example, when the mixture number K in FIG. 2 is 1). It is assumed that the time series data of the communication traffic in FIG. 14A has been generated from normal distributions and that the generation source normal distributions are regarded as hidden states. An output probability distribution b1(ot) (a normal distribution) of a hidden state #1 is denoted by 312-1, and an output probability distribution b2(ot) (a normal distribution) of a hidden state #2 is denoted by 312-2. For simplicity sake, in FIG. 14B, each of the output probability distributions 312-1 and 312-2 of the hidden states is represented by a single one-dimensional.

FIG. 14C illustrates a state sequence estimated by using a continuous HMM on the communication traffic in FIG. 14A. The time series data are quantized by using a normal distribution (a normal distribution from which the time series data is obtained most probably is estimated, and discretization is performed by using state numbers (state names) corresponding to normal distributions of the generation source), and a fluctuation pattern per application type/state is represented by a discrete value.

In FIG. 14C, temporal transitions of the state estimated by using a continuous HMM on the time series data 201 (sections 201-1, 201-2, and 201-3) of the communication traffic (for example, the throughput) is aligned with the time axis of the time series data. In FIG. 14A, for example, the amplitude distributions in the sections 201-1 and 201-3 of the time series data of the communication traffic fall within the same normal distribution 211-1. Thus, the sections 201-1 and 201-3 of the time series data 201 can be considered to belong to the same state #1.

In contrast, the fluctuation (amplitude fluctuation) of the time series data 201 of the communication traffic is large. For example, if the distribution in the section 201-1 of the time series data does not fall within the normal distribution 211-1 and the fluctuation occurs over the range of the normal distribution 211-2, the estimated state fluctuates. If the fluctuation amplitude or the fluctuation number of the time series data of the communication traffic becomes large, the state sequence estimated by using the continuous HMM on the time series data of the communication traffic (for example, the optimum state transition sequence corresponding to the communication traffic (the throughput) obtained by the Viterbi algorithm) also changes (fluctuates) significantly.

Let's assume that the state #1 is an application state (video transmission) (e.g., video transmission from a camera) and a state #2 is also an application state (voice call) (e.g., voice call between terminals). The application state relating to communication traffic is, as a matter of course, not limited to an application type (e.g., video transmission, voice call, etc.). For example, different operating modes (e.g., intermittent image recording mode or real-time video transmission mode) in the same application such as video transmission from a camera may be treated as different states.

Further, a model may be created utilizing time series data selected by the input information selection part 103 from the following:
throughput [bps (bit per second)],
packet inter-arrival time (mean value) [sec] per unit time,
average packet size (mean value) [bytes] per unit time,
the number of packets per unit time and so forth.

Alternatively, as options, the application information from the application information observation part 107 (time-series input information from the IoT such as time-series information of acceleration and changes in wireless quality) may be used to create a model based on the results of calculation by the information amount calculation part 102.

In order to mitigate excessive fluctuation in the states inferred using an HMM, the model creation part 104 may calculate and eliminate the communication noise amount in time series data of communication traffic from the input information generation part 106 in FIGS. 9 and 12. A state sequence may be extracted using an HMM from the time series data obtained by eliminating the communication noise amount from the time series data of communication traffic.

The model creation part 104 may estimate a state sequence estimated using a continuous HMM on the time series data of communication traffic, detect patterns with similar state transitions using a discrete HMM, and group states of the continuous HMM corresponding to similar patterns into one state of an upper layer HMM. Thus, for example, such situations where the communication traffic exhibits erratic fluctuations can be grouped as one state of the upper layer (the discrete HMM).

Figure 15A:
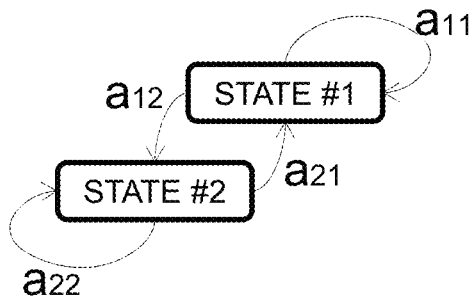
FIGS. 15A and 15B are diagrams illustrating an HMM and a hierarchical HMM, respectively.
Figure 15B:
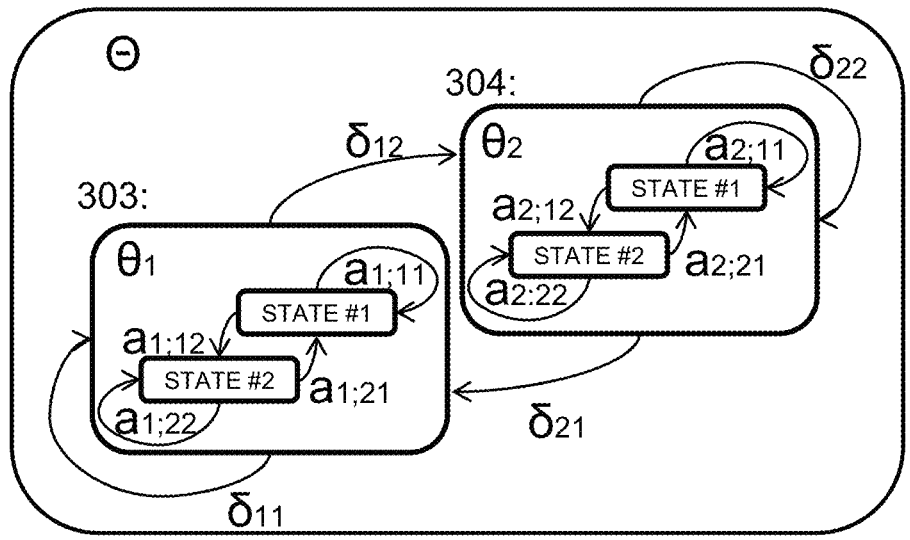

FIGS. 15A and 15B are diagrams illustrating HMM model structures used in the present invention. 301 in FIG. 15A schematically illustrates an example of a model structure of a normal HMM, and 302 in FIG. 15B schematically illustrates an example of a model structure of a hierarchical model. While an example in which the hierarchical model 302 includes two groups 1 and 2 (303 and 304) is illustrated, the number of groups is not limited to 2. The hierarchical model 302 may course include three or more groups. In NPL 1, the hierarchical model 302 in FIG. 15B is referred to as a "multi-level chain model", and an individual group is referred to as a "regime". In the groups 1 and 2, for simplicity, the number of states of the state transition model is set to 2. The number of groups is not of course limited to 2. The number of states of the state transition model is not limited to 2.

Each of the groups holds transition matrixes A1 and A2 between states (the state transition probabilities based on the individual (i,j) elements are a1;$ij$ and a2;$ij$ (i,j=1,2)) and a 2×2 transition matrix Δ between groups (regimes) (the state transition probabilities based on (u,v) elements: δuv (u,v=1, 2)). For example, based on the model parameters $\{\theta_1, \theta_2, \Delta\}$ of the groups, sequence cut points are detected. According to NPL 1, the partial sequences obtained by the division based on these cut points are also referred to as "segments". A group of segments is similar time-series patterns. In FIGS. 4A and 4B, the HMMs of the individual groups 1 and 2 may be continuous HMMs, continuous hierarchical HMMs, discrete HMMs, or discrete hierarchical HMMs.

Figure 16A:
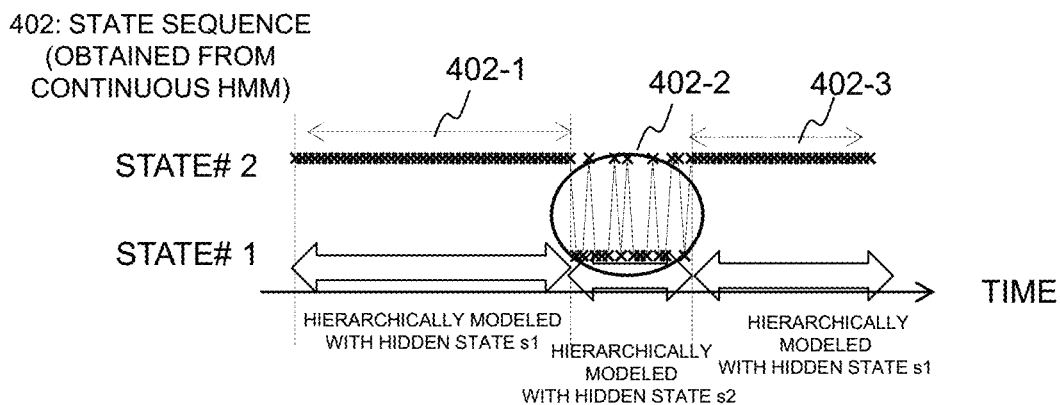
FIG. 16A is a diagram illustrating a state sequence obtained from a continuous HMM with respect to time series data.
Figure 16B:
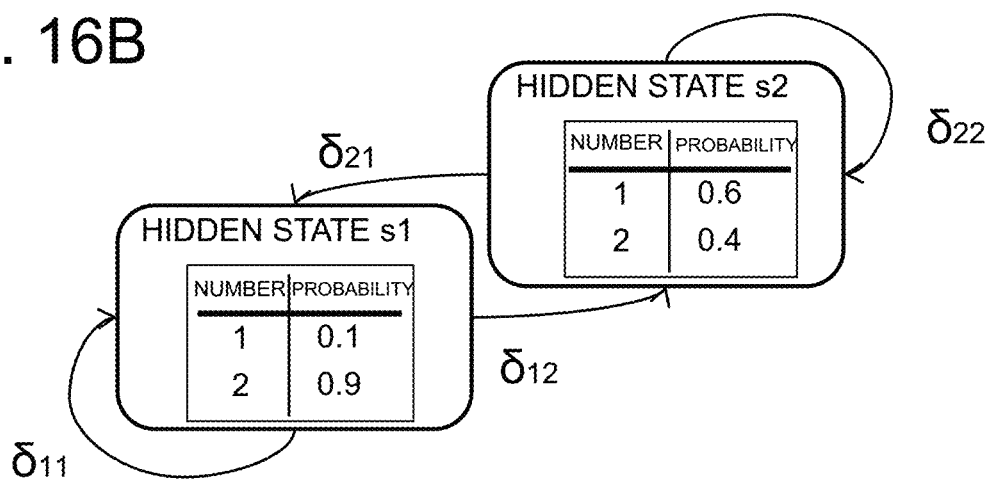
FIG. 16B is a diagram illustrating a discrete HMM representing state transitions in FIG. 16A.
Figure 16C:
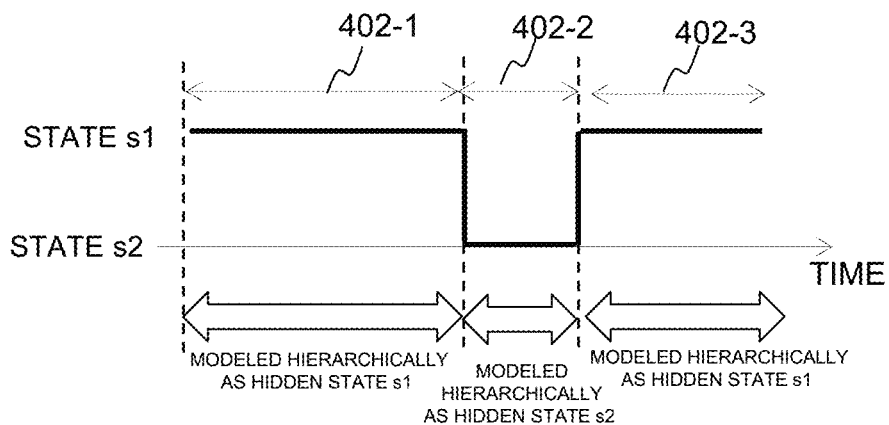
FIG. 16C is a diagram schematically illustrating each inferred state sequence.

FIGS. 16A to 16C are diagrams illustrating state inference using a hierarchical HMM. FIG. 16A illustrates a state sequence inferred using a continuous HMM on communication traffic. It is noted that the state #1 is 0 and the state #2 is 1 in the state sequence in FIG. 16A, though not limited thereto.

In the state sequence (state transitions) obtained from the continuous HMM (FIG. 16A), for example, a time interval 402-2 having fluctuation patterns in which similar fluctuations occur repeatedly between the states #1 and #2 is detected, and the fluctuation patterns detected is grouped in one group (corresponding to 303 and 304 in FIG. 15B) and modeled with a state using a discrete HMM. The fluctuation patterns in FIG. 16A fluctuate between the states #1 and #2 in the continuous HMM in the time interval 402-2 are represented by a state s2 of the discrete HMM in FIG. 16B. (In the time interval 402-2 in which similar fluctuations are repeated, one of the similar fluctuation patterns is schematically represented by one triangular wave in FIG. 16A.) In the example of the discrete HMM illustrated in FIG. 16B, the output probabilities of a hidden state s1 are as follows, as a not-limiting example.

a probability of outputting number 1 (corresponding to the state #1 in FIG. 16A)=0.1
a probability of outputting number 2 (corresponding to the state #2 in FIG. 16A)=0.9
The output probabilities of the hidden state s2
a probability of outputting number 1 (corresponding to the state #1 in FIG. 16A)=0.6
a probability of outputting number 2 (corresponding to the state #2 in FIG. 16A)=0.4

FIG. 16C illustrates an example in which a plurality of states in the continuous HMM are groups into one group and modeled as a state of the discrete HMM, with respect to the time interval 402-2 having a pattern in which state fluctuations are similar in a state sequence obtained from the time series data in FIG. 16A by using the continuous HMM. That is, in FIG. 16A, states include states s1 and s2 of the discrete HMM. The time interval 402-2 of the time series data in FIG. 16A is modeled as a single state (hidden state) s2 of the discrete HMM.

As described above, in the state s2 (hidden state) of the discrete HMM illustrated in FIG. 16B, a ratio between outputting number 1 and number 2 (states #1 and #2 in FIG. 16A) is 3:2 (a ratio between the output probabilities 0.6 and 0.4).

The time transitions (fluctuation pattern) of the states #1 and #2 in the time interval 402-2 in FIG. 16A can be regarded as these hidden states of the continuous HMM grouped together and a hidden state $s_2$ of the discrete HMM undergoing a self-transition with a self-transition probability of $\delta_{22}$, each time transitioning between the states #1 and #2 according to an output probability of hidden state $s_2$. For example, the state #2 in periods 402-1 and 402-3 before and after the time interval 402-2 in FIG. 16A is modeled by the hidden state $s_1$ (self-transition probability $\delta_{11}$) of the discrete HMM.

The state sequence in FIG. 16C illustrates that the communication noise (fluctuations between the state #1 and the state #2) in the time interval 402-1 in the sequence of the state 402 (the state estimated by using a continuous HMM) in FIG. 16A can be removed by using a discrete HMM.

The storage part 105 that stores a hierarchical model (a continuous HMM model+an upper layer discrete HMM model) created by the model creation part 104 may include for example, a semiconductor memory (RAM (Random Access Memory) and EEPROM (Electrically Erasable Programmable Read-Only Memory)) or HDD (Hard Disk Drive). Further, the number of the hierarchical model may be set by flowing sample traffic and by causing the model creation part 104 to analyze time series of sample communication traffic, set model parameters using a well-known EM (Expectation-Maximization) algorithm, and obtain the number of layers with which communication noise such as fluctuations between states is eliminated.

Example Embodiment 4

Figure 17:
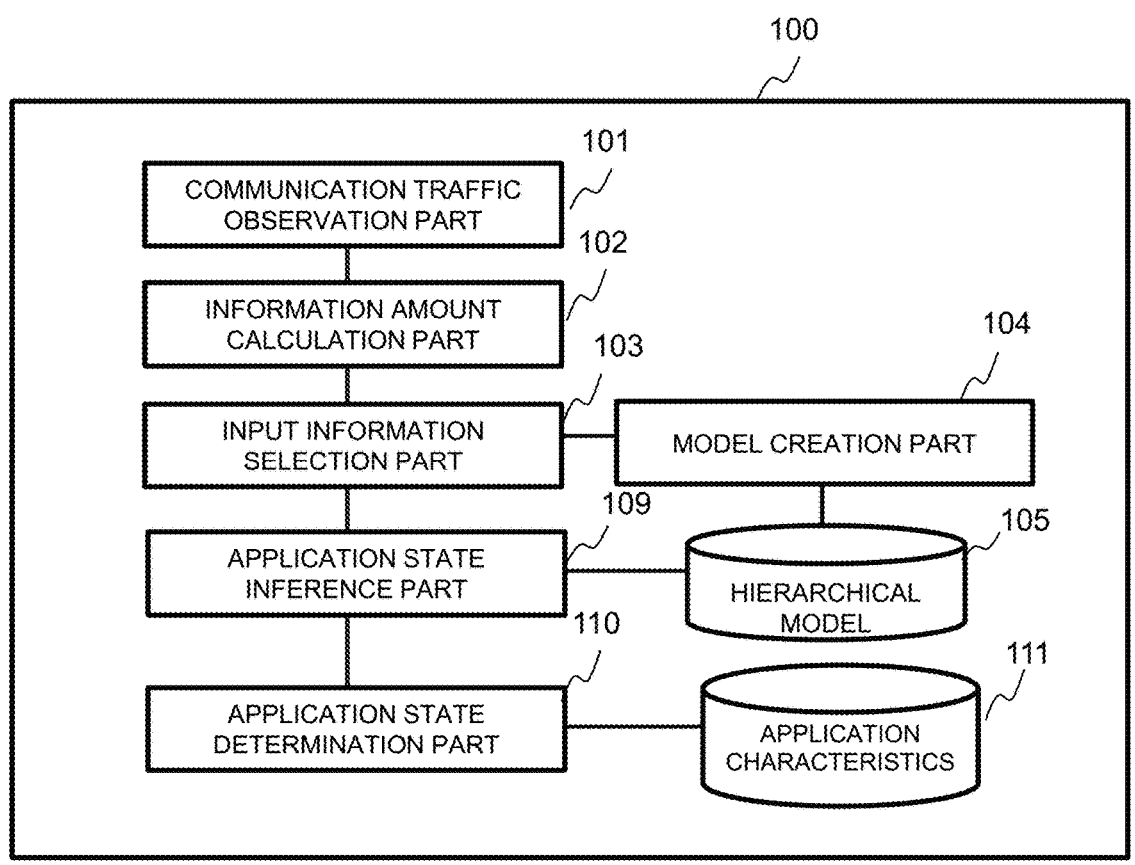
FIG. 17 is a diagram illustrating an example embodiment 4 of the present invention.

FIG. 17 is a diagram illustrating the configuration of an example embodiment 4 of the present invention. The configuration in FIG. 17 includes an application state inference part 109, an application state determination part 110, and a storage part 111 that stores application characteristics (e.g., the fluctuation characteristics of communication traffic) in addition to the configuration of the example embodiment 1 illustrated in FIG. 2.

The application state inference part 109 infers an application state transition using the hierarchical model (continuous HMM+discrete HMM) stored in the storage part 105 on time series data of communication traffic selected by the input information selection part 103. It is noted that the time series data of communication traffic received by the application state inference part 109 from the input information selection part 103 may be the time series data selected and supplied by the input information selection part 103 to the model creation part 104 when the model is created. That is, when the application state inference part 109 infers an application state using the same time series data (of the same type) as the one of communication traffic used by the model creation part 104 to create the model, the calculation of the information amount of the time series data by the information amount calculation part 102 may be omitted. Alternatively, the information amount calculation part 102 may calculate the information amounts of time series data when inferring an application state, and the input information selection part 103 may select time series data based on the information amount and supply the selected data to the application state inference part 109.

FIG. 18 is a diagram for explaining the operation of the application state determination part 110. The application state determination part 110 calculates a similarity between the sequence 702 of application state transitions inferred by the application state inference part 109 and the application characteristics 703 (dotted line) registered in the storage part 111 in advance, and determines which application state a state in a relevant time interval corresponds to. The application characteristics 703 are a state transition sequence of an application whose state transitions are known. The application state determination part 110 may calculate the similarity by calculating the cross-correlation function between the sequence 702 of application state transitions inferred from the time series data 701 of communication traffic based on the model (hierarchical HMM, etc.) stored in the storage part 105 and the application characteristics 703. Alternatively, instead of the cross-correlation function, dynamic time warping (DTW) may be used to calculate a similarity between application states and derive the inference accuracy. This is effective in making a determination when time series data of communication traffic have different time axes with respect to transitions of the same application state.

It is noted that the application state determination part 110 and the application state inference part 109 may be integrated into one unit.

The application state inference part 109, the application state determination part 110, and the storage part 111 storing application characteristics may also be provided in the example embodiments 2 and 3 described above (the description thereof is omitted to avoid duplication).

Figure 19A:
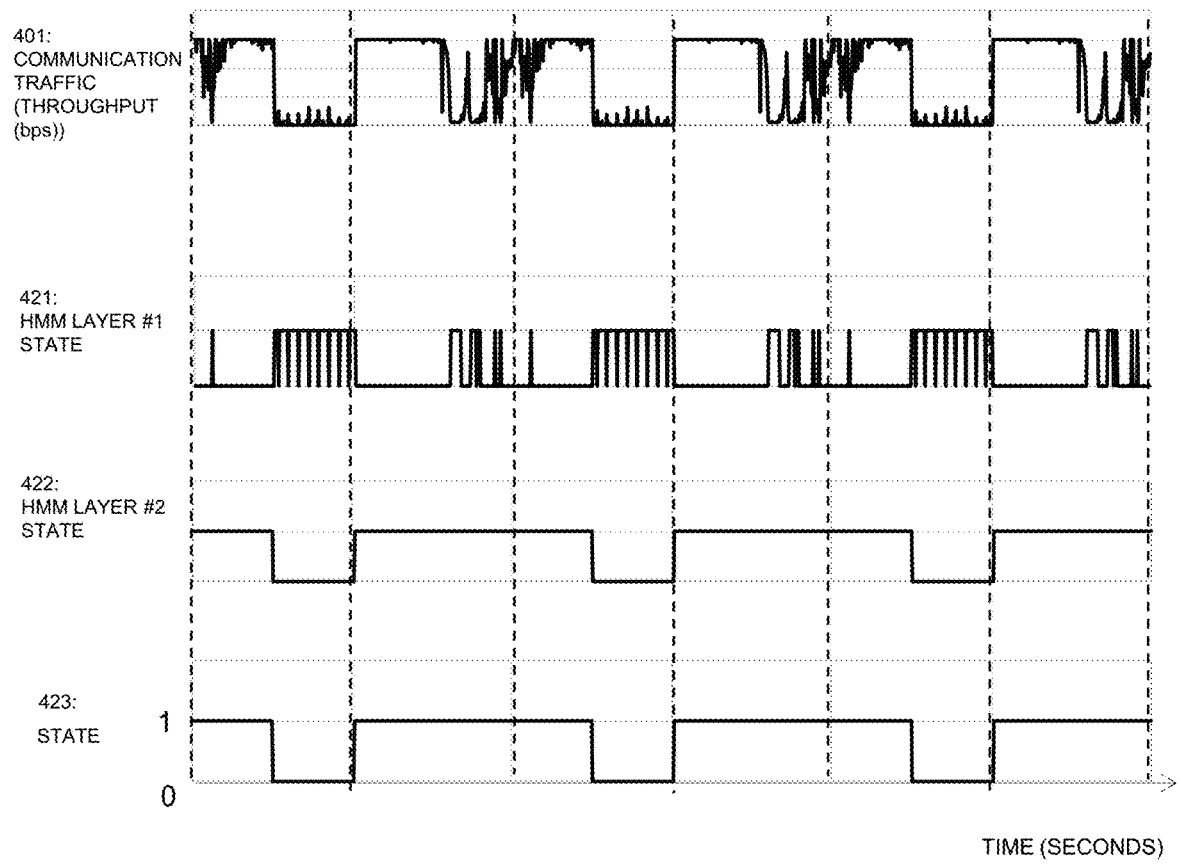
FIGS. 19A and 19B are diagrams illustrating effects of the example embodiment 4 of the present invention.

FIG. 19A is a diagram illustrating an example of an effect of the example embodiment 4. In FIG. 19A, 401 is time series data (throughput) of communication traffic. 421 designates a state sequence inferred by the model creation part 104 using a continuous HMM (HMM layer #1), i.e. a state sequence inferred using a continuous HMM (HMM layer #1) with respect to the time series data (throughput) 401 of communication traffic. According to fluctuations (fluctuation frequency and fluctuation magnitude) in the time series data (throughput) 401 of communication traffic, the state sequence 421 inferred by using the continuous HMM also fluctuates greatly. The model creation part 104 detects patterns with similar transitions between states from the state sequence 421 inferred by using the continuous HMM, groups the detected patterns into one group, represents the one group as a hidden state of an upper layer discrete HMM, and outputs a state sequence using the discrete HMM. 422 (HMM layer #2) in FIG. 19A indicates a state sequence obtained by using the discrete HMM which is a result of grouping similar patterns in the state sequence 421 obtained by using the continuous HMM in a hidden state based on the discrete HMM. That is, for example, state transition patterns drastically fluctuating with high frequency and high amplitude in the state sequence 421 based on the continuous HMM can be grouped together and represented as a single hidden state of the discrete HMM. FIG. 19C illustrates a sequence of states (the output is a binary value of 0 or 1) based on the discrete HMM illustrated in FIG. 19B.

It is noted that the number of layers in the hierarchical model of HMM is not limited to two. For example, when the hierarchical model is learned from sample traffic by using an EM algorithm, the number of layers in the hierarchical model may be set by obtaining the number of layers with which small fluctuations in the throughput (communication noise) is eliminated.

Figure 19B:
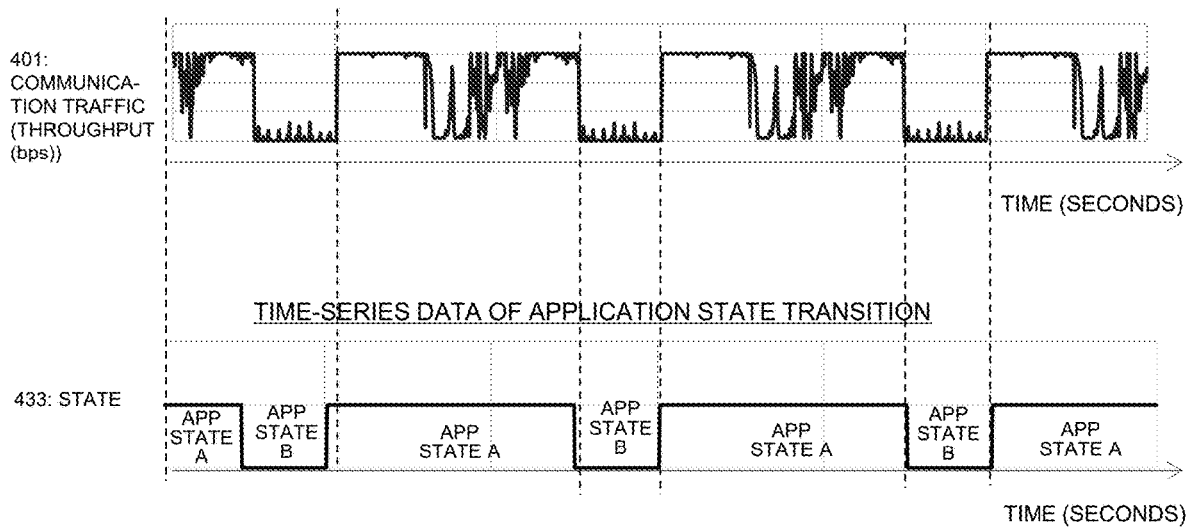

433 in FIG. 19B is a diagram illustrating a sequence of the actual application states in the time series data (throughput) 401 of communication traffic. A value 1 in states 423 in FIG. 19A corresponds to an application state A (video streaming) in 433 in FIG. 19B, and a value 0 in the states 423 in FIG. 19A to an application state B (voice call) in 433 in FIG. 19B.

According to the example embodiment 4, it is possible to create a model capable of accurately inferring an application state from a feature value(s) of communication traffic that fluctuates greatly.

According to the example embodiment 4, it becomes possible to infer an application state transition based on a communication traffic pattern while being unaffected by the influence of communication noise (fluctuation patterns) and improve the inference accuracy. The time series data of communication traffic supplied to the information amount calculation part 102 may be throughput, packet size, packet transmission interval, packet frequency, etc. (e.g., at least one of mean value, variance, maximum value, minimum value, etc.).

The application state inference part 109 and the application state determination part 110 may analyze the time series data (throughput) of communication traffic, extract a feature value(s) such as
   communication cycle,
   communication period of time,
   non-communication period of time, and
   maximum throughput,
compare the extracted feature value with the application characteristics (communication cycle, communication period of time, non-communication period of time, maximum throughput, etc.) stored in the storage part 111, to determine an application state based on the comparison results.

Further, the application state inference part 109 and the application state determination part 110 may determine an application (type, state, and operating mode) from time series data having a common time axis and having a plurality of attributes. That is, the application state A (video transmission) and the application state B (voice call) correspond to an application type. However, the inference target is not limited to an application type and may be a communication mode or operating mode of the same application (e.g., modes of transferring control plane data and user plane data, i.e. control operation and data transfer operation between nodes, etc.).

By analyzing application states in time series data of communication traffic as training data and extracting a feature value(s) (attribute(s)) such as communication cycle, communication period of time, non-communication period of time, and maximum throughput, the application state inference part 109 and the application state determination part 110 may generate a classifier (classification model) for determining an application state by means of machine learning based on correct labels (application states) and data (e.g., at least one of mean value, variance, maximum value, and minimum value of the feature value of communication traffic). When communication traffic is evaluated, an application state may be identified using the trained classifier (classification model) on a feature value(s) extracted from the communication traffic of an evaluation target. The application state inference part 109 and the application state determination part 110 may use a decision tree (tree-structured classifier) as a supervised learning classifier, as a non-limiting example. Alternatively, a random forest in which a plurality of decision trees are created and a decision is made by taking a majority vote may be used. In this case, operating modes of the same application state (application type) may be identified by supplying time series data of communication traffic to a classifier such as a decision tree or random forest. Further, the classifier is not limited to a decision tree or random forest. A support vector machine, naive Bayes classifier, neural network, and the like may be used.

Example Embodiment 5

Figure 20:
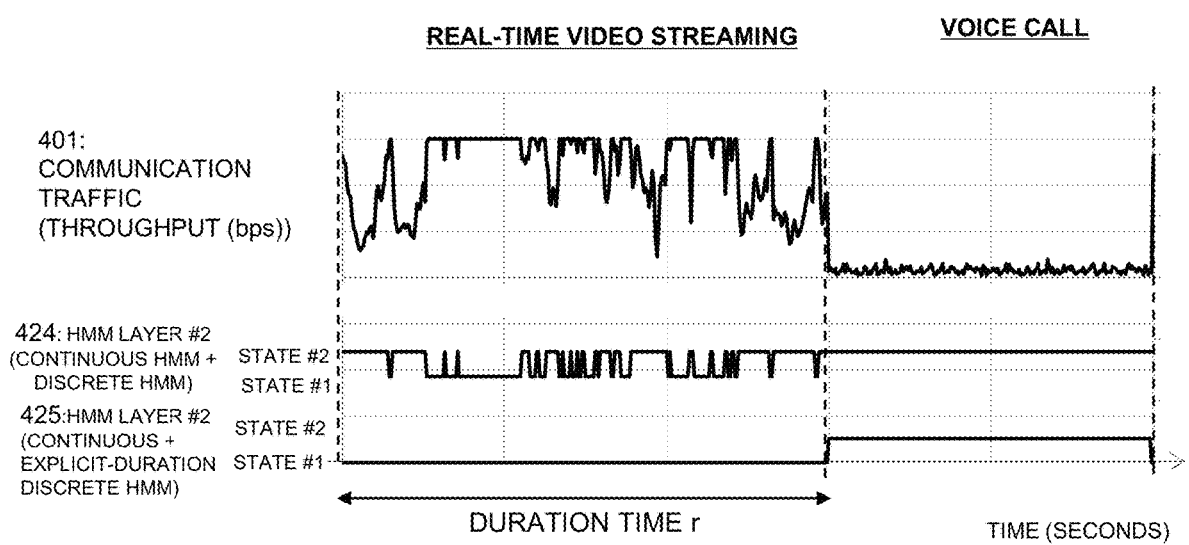
FIG. 20 is a diagram illustrating an example embodiment 5 of the present invention.

FIG. 20 is a diagram for illustrating an example embodiment 5 of the present invention. FIG. 20 is a diagram for explaining a variation of the hierarchical model created by the model creation part 104 illustrated in FIGS. 2, 9, 12, and 17. As communication noise removal means, the model creation part 104 uses, as an HMM state, an HMM in which a state duration time is taken into account. The characteristics of an application state differ from those of communication noise in that video or the like from a camera, which is an IoT (Internet of Things) device, remains in the same state (traffic characteristics, throughput) for a long time. When a coding rate of an encoder that performs compression coding on images acquired from a camera is kept at a constant level for a preset time, a throughput of communication traffic from the camera is kept constant. However, communication noise occurs instantaneously.

The time series data normalization part 103 according to the example embodiment 5 may use an HMM (Explicit-Duration HMM: EDHMM) that takes into account a state duration time distribution, in which it is assumed that a state does not change for a certain time, and remove communication noise that occurs instantaneously as illustrated in FIG. 21, for example. In this case, a hidden state zt is given by a state st and a duration time rtt.

$$zt=\{st,rt\}$$

In addition to the model parameter (of the continuous mixture HMM) with an assumption that input value does not change for a certain period of time, the parameter $\lambda_i$ of a duration distribution $F_r$ unique to the state i is added.

Let a state sequence be $s=(s_1, \ldots, s_T)$ and a remaining duration sequence $r=(r_1, \ldots, r_T)$.

In EDHMM,

Unless $r_t=0$, a current remaining duration time is counted down by 1 and the state $s_t$ continues.

If $r_t=0$, the state $s_t$ transitions a state $s_m$ ($m \neq t$).

According to the present example embodiment, a continuous HMM and ED (Explicit-Duration) type discrete HMM are used as a hierarchical model in FIG. 20. For example, the state #1 (application: real-time video streaming) continues without being influenced by fluctuations (communication noise) in the communication traffic (throughput) occurring from a start of the state until a remaining duration time is 0 (refer to the duration time r in FIG. 20). Unlike a state sequence 424 in FIG. 20, there is no influence from communication noise. An HMM layer #2 (continuous HMM+discrete HMM) of 424 in FIG. 20 can correspond to the HMM layer #2 of 422 in FIG. 19A. The application state determination part 110 outputs a state sequence illustrated in an HMM layer #2 of 425 in FIG. 20. 425 in FIG. 20 illustrates a state sequence inferred using a discrete HMM in which a state duration time is taken into consideration with respect to a state sequence inferred according to a continuous HMM.

It is noted that in the example of FIG. 20, since it is assumed that the application state (real-time video streaming) does not change for a certain period of time, a duration time r (model parameter) of each state in the application state (video; the state #1 in 425) is constant in the state sequence s=(s$_1$, . . . , s$_T$).

In a case where the duration time r of the state #1 changes depending on a operating mode of an application (e.g., the same real-time video streaming), the application state inference part 109 in FIG. 17 may, as a matter of course, infer the duration time r based on an HMM, by taking into account an influence from fluctuations (communication noise) in the communication traffic (throughput). It is noted that the continuous HMM may be constituted by an EDHMM.

According to the example embodiment 5, while setting of a model parameter of a duration time is further needed, the same effects as those of the example embodiment 1 can be obtained Example Embodiment 6

Figure 21A:
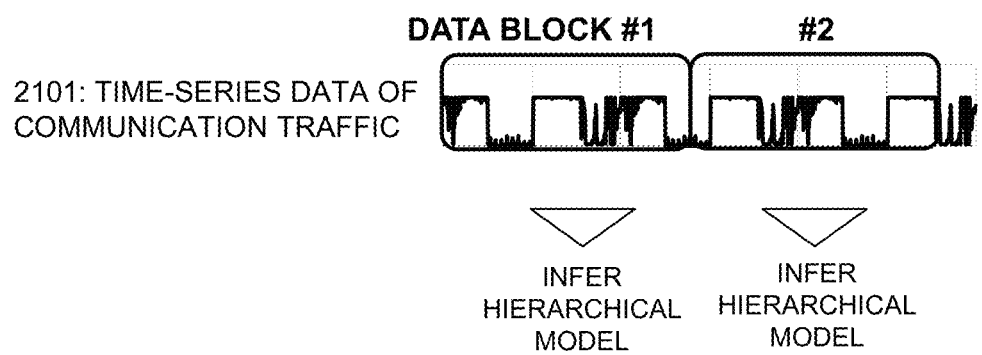
FIGS. 21A and 21B are diagrams illustrating an example embodiment 6 of the present invention.

A example embodiment 6 of the present invention will be described. In the first to example embodiment 5s, the model creation part 104 may update the model in real time. The model creation part 104 updates the hierarchical model in order to follow a change in the characteristics of an application state, which is a traffic source. The method for updating the hierarchical model may be broadly divided into, for example, batch processing and online processing. In the batch processing, as illustrated in FIG. 21A, time series data 2101 of the latest communication traffic is analyzed in an appropriate data block length (input data length), and the hierarchical model is updated based on a result of analysis of the data block. The hierarchical HMM is inferred identically to the example embodiment 1 described above. The data block length may be fixed or variable.

In a case where in the model creation part 104, a variable data block length is used, for example, when the number of states in a data block is 1 (when the same state continues for a long time), the data block length may be extended.

when the number of states is more than one, the data block length may be shortened.

Model parameters updated by the model creation part 104 include at least one of the model parameter of the continuous mixture HMM described above, the model parameters θ$_1$ and θ$_2$ for each group in the upper layer HMM model, and the transition probability Δ between the groups (state transition probability δ$_{av}$ (u,v=1,2)) (refer to FIG. 15B).

Figure 21B:
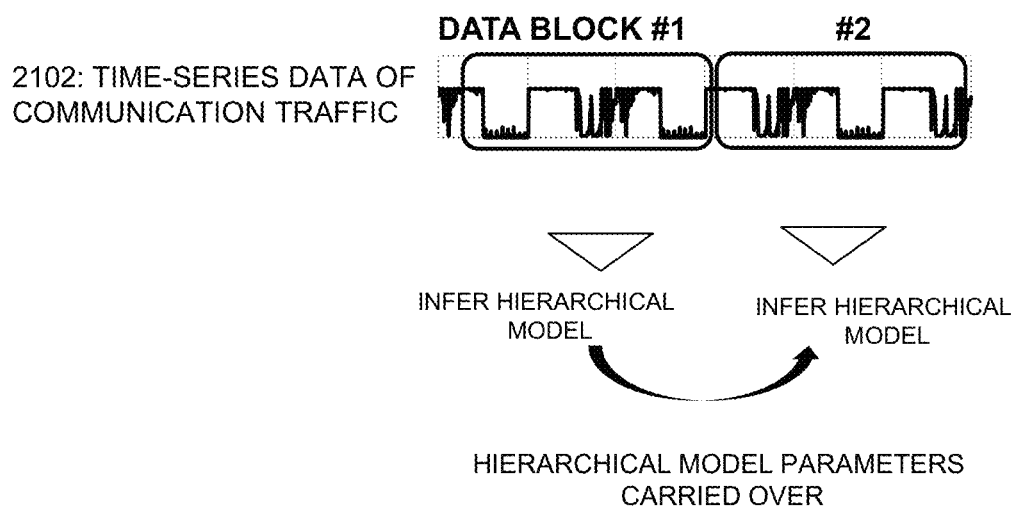

In the online processing, when a hierarchical model of a data block is inferred, the hierarchical model may be inferred from the model parameter of a data block #1 analyzed in the past and a current (newly obtained) data block #2 in time series data 2102 of communication traffic as illustrated in FIG. 21B. The model creation part 104 may update the hierarchical model of the current data block by using model parameters of a plurality of past data blocks. Incremental model inference can reduce a calculation amount and satisfy a timing budget critically required for the online processing. The hierarchical model inference processing may be the same as in the example embodiments described above.

According to the example embodiment 6, by updating the hierarchical model according to a change in the characteristics of an application state, it becomes possible to follow a change in the characteristics of the application state and further improve an inference accuracy of an application state from communication traffic.

Example Embodiment 7

Figure 22:
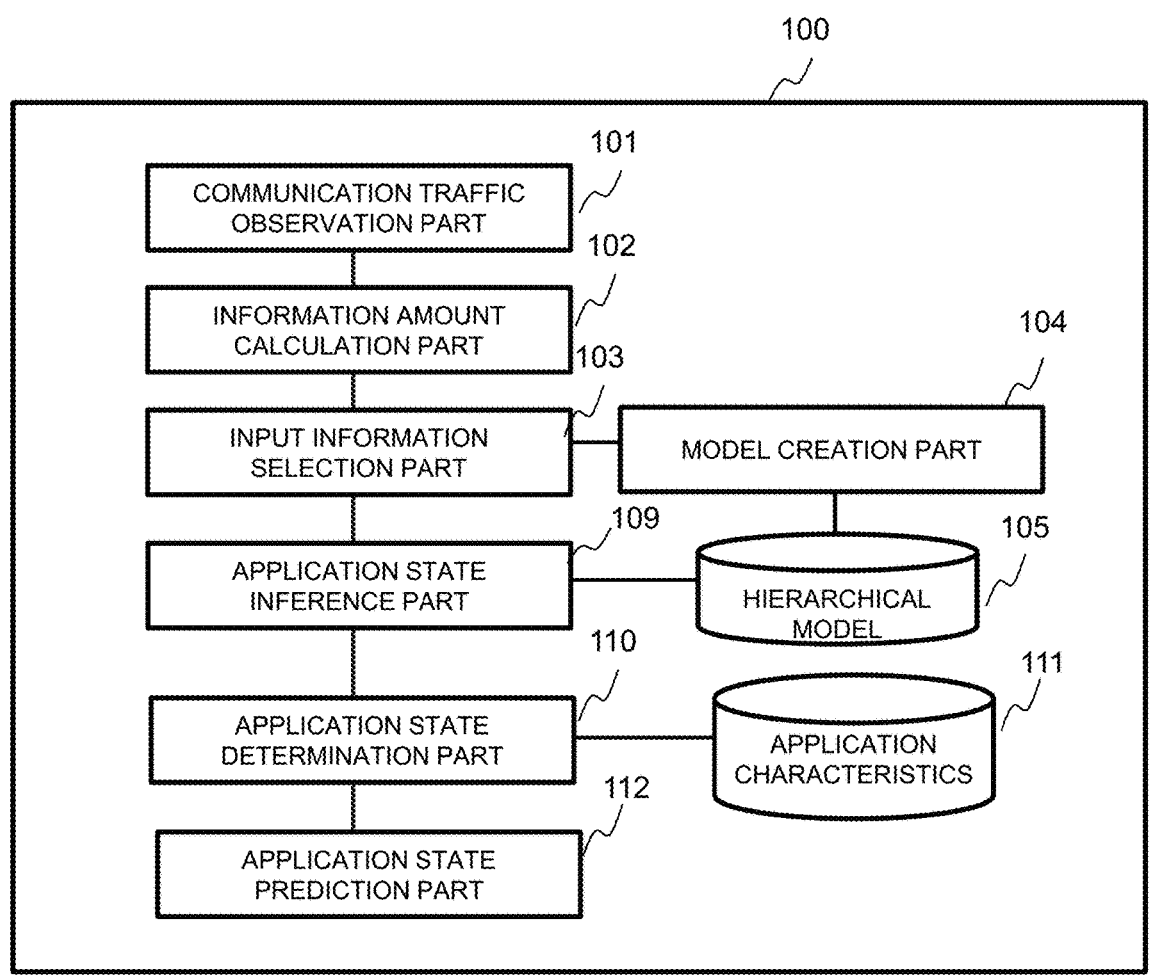
FIG. 22 is a diagram illustrating an example embodiment 7 of the present invention.
Figure 23:
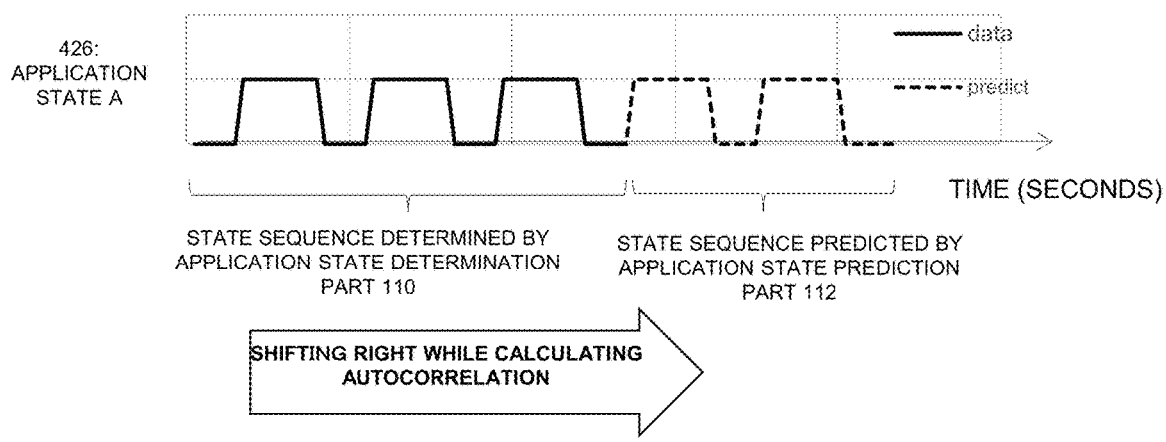
FIG. 23 is a diagram illustrating the example embodiment 7 of the present invention.

FIG. 22 is a diagram illustrating an example embodiment 7 of the present invention. Referring to FIG. 22, in addition to the configuration of FIG. 17, an application state prediction part 112 is further provided in the example embodiment 7. The application state prediction part 112 predicts a future application state transition pattern using an application state determined by the application state determination part 110. As the prediction method of the application state prediction part 112, a point prediction or interval prediction may be used as schematically illustrated in FIG. 23. For example, autocorrelation may be calculated for an inferred application state sequence to predict a future state sequence. In FIG. 23, a dotted line indicates a future occurrence sequence of the application state A.

Alternatively, the application state prediction part 112 may perform stochastic prediction 1 (simulation). By using parameters estimated by using an HMM, future prediction is performed in accordance with a Markov Chain Monte Carlo (MCMC), for example. In the MCMC, a new sample is acquired based on a sample acquired immediately therebefore. There are a Metropolis-Hastings (MH) algorithm, Gibbs sampling, etc. Among these techniques, in the MH algorithm, a value used as the next candidate is generated from a probability distribution referred to as a proposed distribution q(y|x), and whether to adopt or reject the value is determined based on a value referred to as adoption/rejection α.

That is,

Step 1:

an initial value x$^{(0)}$ is determined.

Step 2 and thereafter, the following is performed for t=0, 1, . . .

y is generated from a proposed distribution q(y|x$^{(t)}$) and u is generated from a uniform distribution.

When u is less than or equal to α(x$^{(t)}$, y), x$^{(t+1)}$=y.

Otherwise, $$x^{(t+1)}=x(t) \qquad (25)$$

where $$\alpha(x^{(t)},y)=\min\{1,\pi(y)q(x|y)/(\pi(x)q(y|x))\} \qquad (26)$$

(x$^{(0)}$, x$^{(1)}$, . . . ) generated by the MH algorithm forms a Markov chain. The Markov chain has an invariant distribution, irreducibility, and a non-periodic property. Samples after a large m(x$^{(m+1)}$, x$^{(m+2)}$, . . . ) can be regarded to have been sampled from an objective distribution π(x).

In contrast, in the Gibbs sampling,

Step 1:

a stochastic variable x is divided into k blocks x=(x1, . . . , xk).

Step 2 and thereafter, the following is repeated on t=0, 1, . . .

The individual x$_i$$^{(t+1)}$ is sampled from a conditional probability.

$$p(x_j|x_1^{(t)},x_{j-1}^{(t)},x_{j+1}^{(t)}, \ldots ,x_k^{(t)}) \qquad (27)$$

As probabilistic prediction 2 (analysis), a state probability in an individual future state may be calculated by using dynamic programming such as a forward algorithm. In the above forward algorithm, model parameters and an observed sequence are given, and a probability distribution of hidden variable states in the last of the sequence is calculated.

The example embodiment 7 makes it possible to predict a future application state from a hitherto determined application state.

As a variation of the example embodiment 7, the application state prediction part 112 may further predict communication traffic (e.g., a throughput thereof, etc.) by utilizing a prediction result of an application state. That is, a communication traffic prediction part may be integrated into the application state prediction part. Alternatively, the application state prediction part and the communication traffic prediction part may be separate units. Time-series prediction may be performed as a method for predicting future communication traffic (e.g., the throughput thereof).

For example, the application state prediction part 112 constructs time-series of an AR (Auto Regressive) model of communication traffic (throughput) per application state, for example. In the AR model (AR(p)), an output $y_t$ depends only on past p outputs.

$$y_t = -\Sigma <i=1,p> y_{(t-i)} + \varepsilon_t \quad (28)$$

where $\varepsilon_t$ is $N(0, \Sigma)$ (Gaussian white noise).

The application state prediction part 112 selects a time-series model corresponding to the predicted future application state.

For example, according to Expression (28), the application state prediction part 112 predicts future communication traffic (e.g., the throughput thereof) from the selected time-series models.

As another method for predicting future communication traffic (throughput), the application state prediction part 112 may predict future communication traffic from a model parameter(s) of an HMM. When the hierarchical model is created, an output probability may be used to represent from what distribution communication traffic (throughput) is generated. The application state prediction part 112 may predict future communication traffic (e.g., a throughput thereof) by selecting an output probability corresponding to the predicted application state.

Example Embodiment 8

Figure 24:
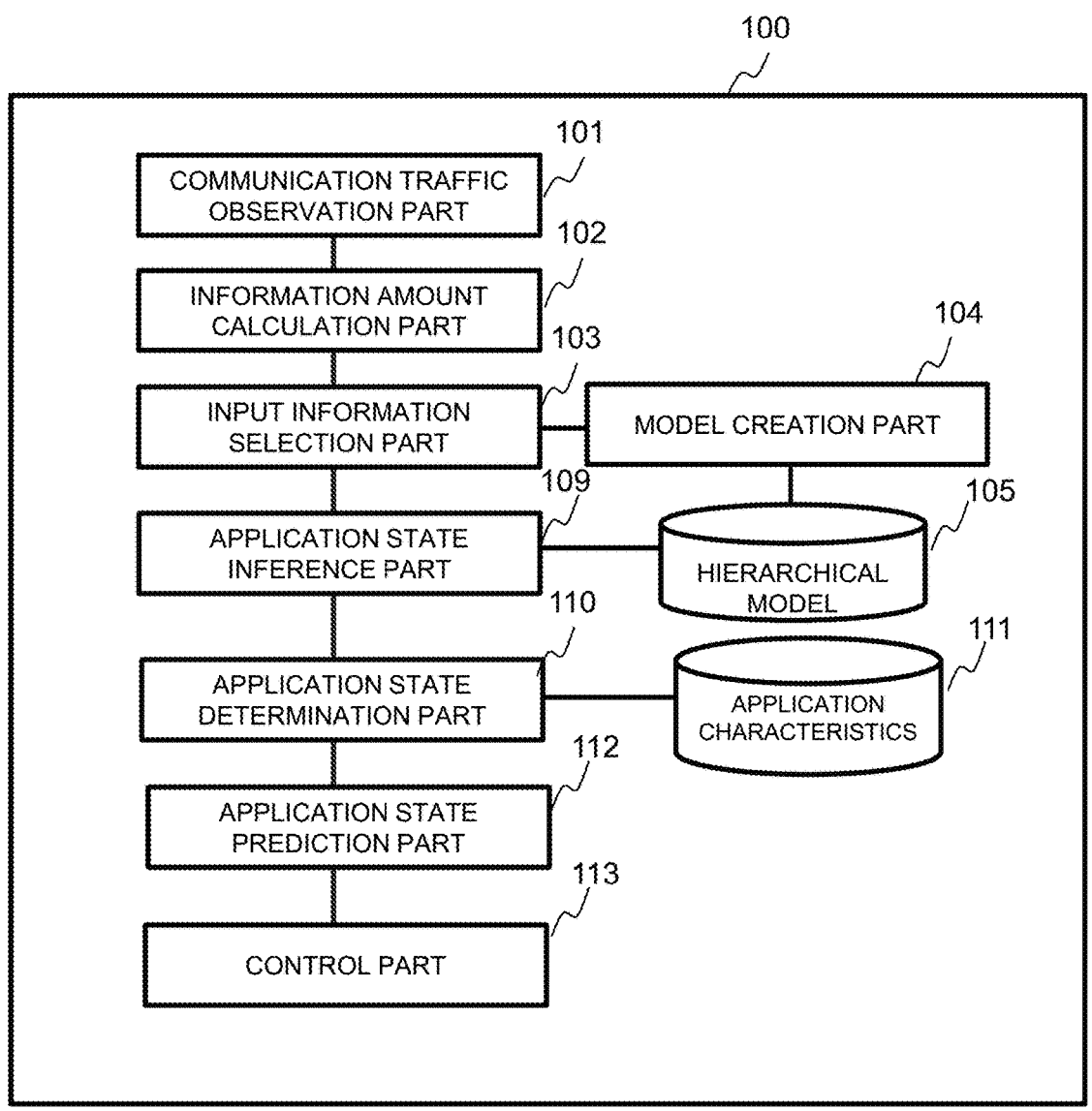
FIG. 24 is a diagram illustrating an example embodiment 8 of the present invention.

FIG. 24 is a diagram illustrating an example embodiment 8 of the present invention. Referring to FIG. 24, a control part 113 that performs communication control according to an inferred application state is further provided in the example embodiment 8 in addition to the configuration of FIG. 22.

The control part 113 may directly perform communication control or transmit communication control instructions to the network node 20 (L3 switch, base station, gateway, etc.) in FIGS. 4A and 4B. For example, in the case of FIG. 4C, the control part 113 directly controls communication between the terminal 30 and the server 40.

In a case where the network node 20 in FIGS. 4A and 4B includes a router (edge router, etc.) or the traffic analysis apparatus 100 includes the functions of a router in FIG. 4C, the control part 113 may control traffic shaping or filtering according to the application state as network control. In traffic shaping, the packet transmission speed (transmission interval) is adjusted to keep the communication traffic to a constant rate (e.g., bandwidth securing, bandwidth limiting, and priority control may be performed). In filtering, for example, the communication traffic may be inspected, and individual network connections may be allowed or denied based on specified filtering rules.

In a case where the network node 20 in FIGS. 4A and 4B includes a base station, the traffic analysis apparatus 100 includes functions of a base station in FIG. 4C, or the traffic analysis apparatus 100 is implemented on a mobile edge computing apparatus, there is a such case in which a radio channel is assigned according to on a radio quality. In this case, radio scheduling may be performed in which a radio channel is preferentially assigned to a terminal indicating a high level of urgency, for example.

Alternatively, the traffic analysis apparatus 100 may be implemented as a traffic detection function (TDF) of a carrier network. TDF may perform analysis of a relationship between traffic and an application state to identify an application corresponding to the traffic. In this case, a PCRF (Policy and Charging Rules Function) may determine a control rule, and a PCEF (Policy and Charging Enforcement Function) or the like may perform control for band control, path modification, etc.

The control part 113 may perform, as communication control based on an application state, control of communication timing (transmission time, and/or transmission interval of packet data, etc.) and compression coding (compression coding scheme, coding rate, frame rate, resolution, etc.) of an encoder (encoding part) not illustrated in a transmission source, a relay station (transcoder), etc.

The example embodiment 8 makes it possible to perform network control, communication control or the like according to an application state.

Example Embodiment 9

Figure 25:
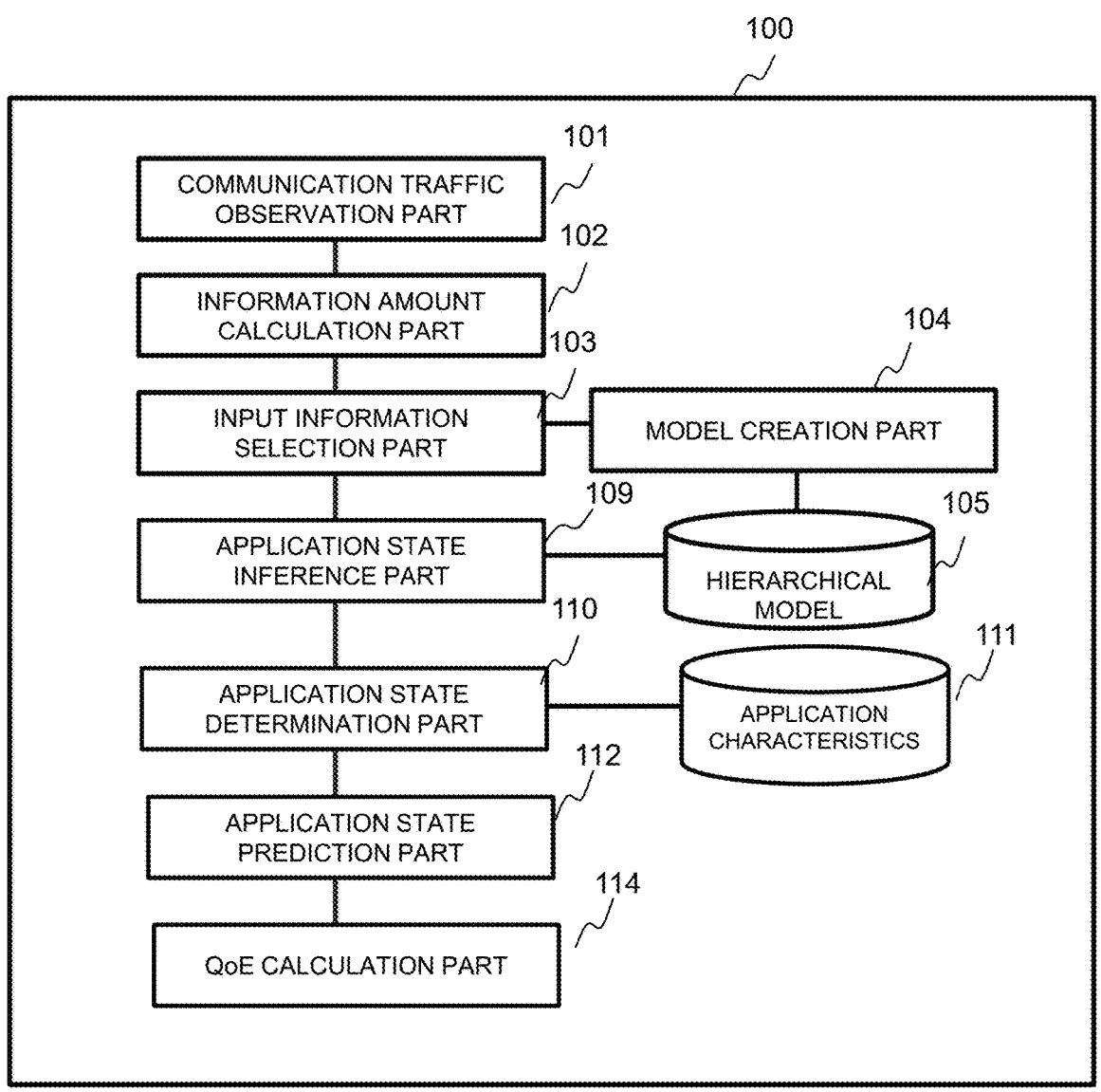
FIG. 25 is a diagram illustrating an example embodiment 9 of the present invention.

FIG. 25 is a diagram illustrating an example embodiment 9 of the present invention. Referring to FIG. 25, a QoE calculation part 114 is further provided in addition to the configuration of FIG. 22 in the example embodiment 9. The QoE calculation part 114 analyzes to what extent communication quality for each inferred application state is provided, and calculates (evaluates) QoE (Quality of Experience), which is an application quality (e.g., Web QoE, video QoE, etc.). QoE measured by a node (terminal, server, etc.) which is a destination of a web page and video may be collected and stored in association with the application state. The QoE calculation part 114 may find QoE corresponding to communication traffic (throughput) or an application state determined by the application state determination part 110.

As to QoE of a Web application, for example, when display is completed quickly after a click, the QoE calculation part 114 may determine that the QoE is "good".

As to QoE of remote machine control (drone, machine tool, or automobile), for example, when a control command entered from outside quickly arrives at a device or when a delay is kept constant, the QoE calculation part 114 may evaluate that the QoE is "good".

As to QoE of a file transfer application, for example, when transfer is quickly completed, when transfer does not fail, or the like, the QoE calculation part 114 may evaluates the QoE highly.

According to the example embodiment 9, QoE corresponding to a determined application state can be determined.

Example Embodiment 10

Figure 26:
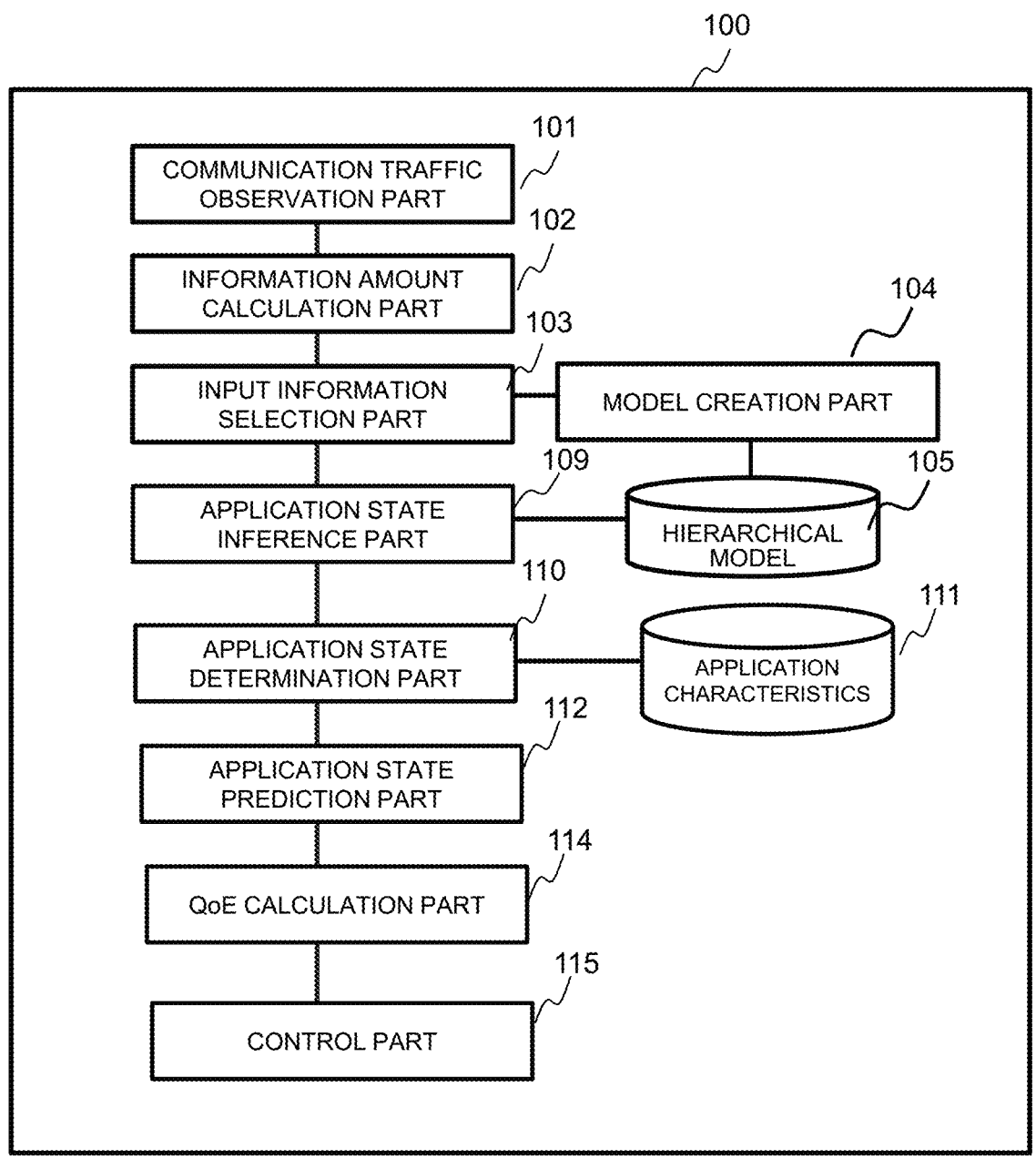
FIG. 26 is a diagram illustrating an example embodiment 10 of the present invention.

FIG. 26 is a diagram illustrating the configuration of an example embodiment 10 of the present invention. Referring to FIG. 26, a control part 115 is provided in the example embodiment 10 in addition to the configuration of FIG. 25. The control part 115 controls an application provided by a telecommunications carrier based on a application quality (QoE) calculated (evaluated) by the QoE calculation part 114. In the example embodiment 10, the application state prediction part 112 illustrated in FIG. 22, etc., may be provided and the QoE calculation part 114 may calculate QoE corresponding to a predicted future application state.

The control part 115 may execute network/communication control by prioritizing an application having a poorer QoE calculated by the QoE calculation part 114, as a non-limiting example. As a result, the QoE of the entire system is improved and smoothed (levelled).

Alternatively, when QoE falls below a threshold value indicating poor quality (e.g., when QoE falls below "bad," 2 on the 5-point scale), the control part 115 may executes network control and/or communication control so as to lower a priority of this application. As a result, by lowering a priority of an application that cannot maintain a predetermined application quality (QoE), the quality of an application with higher priority can be ensured.

When the QoE calculated by the QoE calculation part 114 is too good, the control part 115 may execute network control and/or communication control so as to lower a priority of a corresponding application.

Based on the QoE and an application state obtained up to a current time, the QoE calculation part 114 may output a QoE prediction value corresponding to the application state. In this case, the control part 115 can control a priority level of an application based on a prediction value of a future QoE.

According to the example embodiment 10, based on QoE determined or a prediction value of a future QoE, network control and/or communication control can be performed, and priority control on the corresponding application can be realized.

Example Embodiment 11

Figure 27:
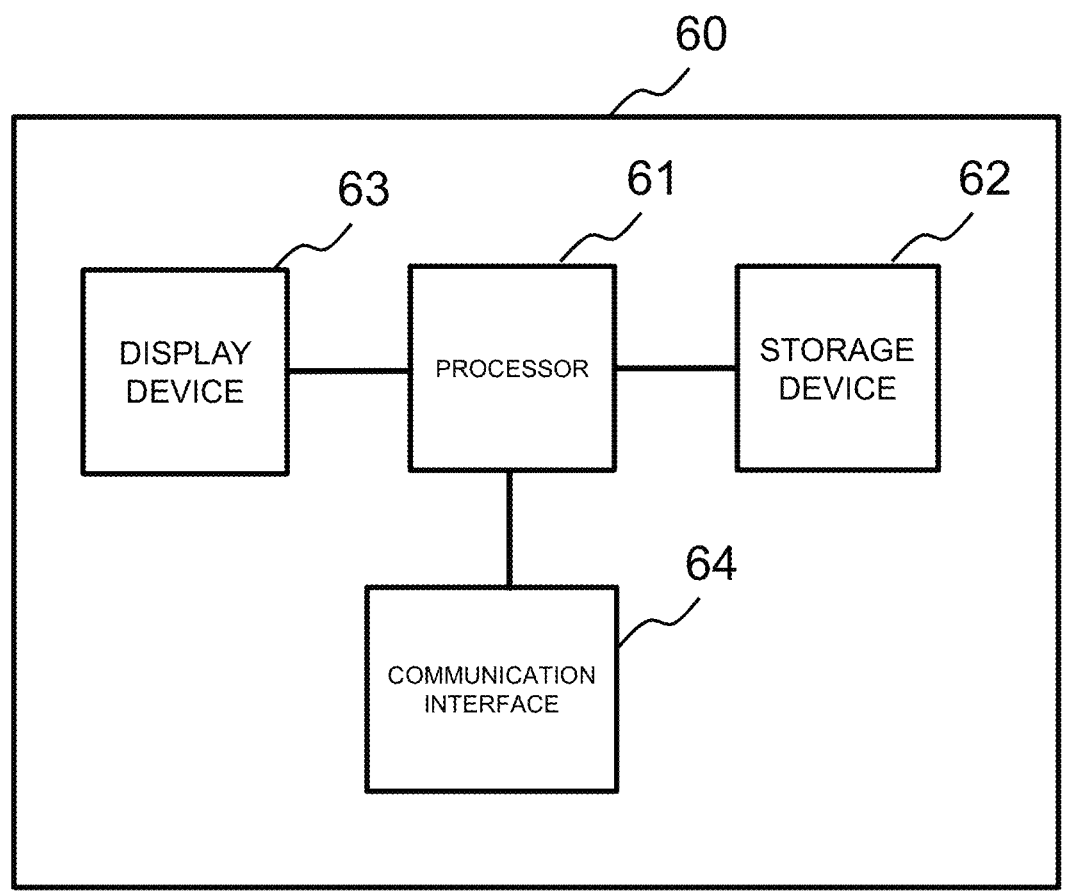
FIG. 27 is a diagram illustrating an example embodiment 11 of the present invention.

FIG. 27 is a diagram illustrating a configuration in which the traffic analysis apparatus 100 is implemented using a computer apparatus 60 as the example embodiment 11 of the present invention. Referring to FIG. 27, the computer apparatus 60 includes a processor (CPU (Central Processing Unit)) 61, a storage device (memory) 62, a display device 63, and a communication interface 64. The storage device 62 may be configured to include, for example, a semiconductor storage (such as RAM, ROM, EEPROM and the like), HDD, CD, and DVD. The storage device 62 stores a program (commands, data, etc.) executed by the processor 61. The processor 61 realizes the functions of the traffic analysis apparatus 100 of each Example Embodiment described above by executing the program stored in the storage device 62. The communication interface 64 is an interface that controls the communication connection to the network node 20 in FIGS. 4A and 4B. The communication interface 64 may function as a network interface that forwards a packet (e.g., a packet exchanged between the terminal 30 and the server 40) flowing through the communication network in FIG. 4C. The program (software) executed by the processor 61 includes information amount calculation processing that calculates information amounts of a plurality of items of time series data relating to communication traffic and input information selection processing that selects at least one item of time series data based on the information amounts of the plurality of items of time series data. The program (software) executed by the processor 61 may include a processing step of realizing the functions of the traffic analysis apparatus 100 described as the example embodiments 1 to 10.

The disclosure of each of the above NPLs 1 to 3 is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in each of the claims, example embodiments, drawings, etc.) are possible within the scope of the claims of the present invention. Namely, the present invention of course includes various variations and modifications that could be made by those skilled in the art according to the overall disclosure including the claims and the technical concept.

The above example embodiments can be noted as follows (but not limited thereto).

(Supplementary Note 1)

A traffic analysis apparatus comprising:

an information amount calculation part that calculates an information amount of each of a plurality of items of time series data relating to communication traffic; and an input information selection part that selects at least one item of time series data as an analysis target from the plurality of items of time series data based on the information amounts of the plurality of items of time series data.

(Supplementary Note 2)

The traffic analysis apparatus according to Supplementary Note 1, wherein the plurality of items of time series data relating to the communication traffic are a plurality of items of time series data relating to the same communication traffic and having a plurality of attributes with a common time axis.

(Supplementary Note 3)

The traffic analysis apparatus according to Supplementary Note 1 or 2, wherein the information amount calculation part calculates as the information amount an information amount that serves as an index indicating suitability for extracting a characteristic pattern from the time series data of the communication traffic.

(Supplementary Note 4)

The traffic analysis apparatus according to any one of Supplementary Notes 1 to 3, wherein the information amount calculation part calculates a sample entropy of the time series data of the communication traffic as the information amount.

(Supplementary Note 5)

The traffic analysis apparatus according to Supplementary Note 4, wherein the input information selection part selects at least one item of time series data based on the value of the sample entropy.

(Supplementary Note 6)

The traffic analysis apparatus according to any one of Supplementary Notes 1 to 5, further comprising an input information generation part that generates time series data obtained by performing arithmetic processing on the time series data of the communication traffic and supplies the generated data to the information amount calculation part.

(Supplementary Note 7)

The traffic analysis apparatus according to Supplementary Note 6, further comprising an application information observation part that acquires application information relating to the communication traffic and supplies the acquired information to the input information generation part.

(Supplementary Note 8)

The traffic analysis apparatus according to Supplementary Note 7, further comprising a cause analysis part that analyzes a cause of being in an application state inferred based on the time series data selected by the input information selection part.

(Supplementary Note 9)

The traffic analysis apparatus according to any one of Supplementary Notes 1 to 8, further comprising a model creation part that creates a probabilistic state transition model for representing a pattern and a transition thereof in time series data of the communication traffic selected by the input information selection part based on the time series data.

(Supplementary Note 10)

The traffic analysis apparatus according to Supplementary Note 9, wherein the model creation part models a state transition in the time series data of the communication traffic selected by the input information selection part with a state transition model utilizing a hidden Markov model, groups a plurality of hidden states of the hidden Markov model in a time interval in the time series data, in which similar fluctuations are repeated, and which is modeled with the plurality of hidden states, and models the grouped states with a hidden state of an upper layer hidden Markov model immediately above the hidden Markov model.

(Supplementary Note 11)

The traffic analysis apparatus according to Supplementary Note 10, wherein the model creation part models a state transition in the time series data of the communication traffic selected by the input information selection part with a continuous hidden Markov model, uses a discrete hidden Markov model as the upper layer hidden Markov model immediately above the continuous hidden Markov model, and creates a hierarchical model that models output transitions of the plurality of hidden states of the continuous hidden Markov model grouped into one group using an output probability and a transition probability of a hidden state of the discrete hidden Markov model.

(Supplementary Note 12)

The traffic analysis apparatus according to any one of Supplementary Notes 9 to 11, further comprising:

an application state inference part that infers an application state corresponding to the time series data selected by the input information selection part from the time series data based on the model; and an application state determination part that determines an application state corresponding to the time series data based on the inferred application state and application characteristics registered in advance.

(Supplementary Note 13)

The traffic analysis apparatus according to Supplementary Note 12, wherein the application state determination part determines an application state, based on a similarity between a sequence of the inferred application states and a sequence of application characteristics registered in advance.

(Supplementary Note 14)

The traffic analysis apparatus according to Supplementary Note 12 or 13, comprising a QoE calculation part that determines the application quality (QoE) based on the application state.

(Supplementary Note 15)

The traffic analysis apparatus according to any one of Supplementary Notes 12 to 14, further comprising a control part that performs at least one of network control and communication control, based on the application state, the application quality (QoE) calculated based on the application state, or the result of predicting a future application state.

(Supplementary Note 16)

A traffic analysis method including:

calculating an information amount of each of a plurality of items of time series data relating to communication traffic; and selecting at least one item of time series data based on the information amounts of the plurality of items of time series data.

(Supplementary Note 17)

The traffic analysis method according to Supplementary Note 16, wherein the plurality of items of time series data relating to the communication traffic are a plurality of items of time series data relating to the same communication traffic and having a plurality of attributes with a common time axis.

(Supplementary Note 18)

The traffic analysis method according to Supplementary Note 16 or 17, comprising calculating as the information amount an information amount that serves as an index indicating suitability for extracting a characteristic pattern from the time series data of the communication traffic.

(Supplementary Note 19)

The traffic analysis method according to any one of Supplementary Notes 16 to 18, comprising calculating a sample entropy of the time series data of the communication traffic as the information amount.

(Supplementary Note 20)

The traffic analysis method according to Supplementary Note 19, comprising selecting at least one item of time series data based on the value of the sample entropy.

(Supplementary Note 21)

The traffic analysis method according to any one of Supplementary Notes 16 to 20, comprising generating time series data obtained by performing arithmetic processing on the time series data of the communication traffic and supplying the generated data to the process of calculating the information amount of the generated time series data.

(Supplementary Note 22)

The traffic analysis method according to Supplementary Note 21, comprising acquiring application information relating to the communication traffic.

(Supplementary Note 23)

The traffic analysis method according to Supplementary Note 22, comprising analyzing a cause of being in an application state inferred based on the selected time series data.

(Supplementary Note 24)

The traffic analysis method according to any one of Supplementary Notes 16 to 23, comprising creating a probabilistic state transition model for representing a pattern and a transition thereof in a selected time series data of the communication traffic based on the time series data.

(Supplementary Note 25)

The traffic analysis method according to Supplementary Note 24, comprising:

modeling a state transition in a selected time series data of communication traffic with a state transition model utilizing a hidden Markov model, grouping a plurality of hidden states of the hidden Markov model in a time interval of the time series data, in which similar fluctuations are repeated, and which are modeled with the plurality of hidden states; and modeling the grouped states with a hidden state of an upper layer hidden Markov model immediately above the hidden Markov model.

(Supplementary Note 26)

The traffic analysis method according to Supplementary Note 25, comprising:

modeling a state transition in a selected time series data of communication traffic with a continuous hidden Markov model;

having a discrete hidden Markov model as the upper layer hidden Markov model immediately above the continuous hidden Markov model; and creating a hierarchical model that models output transitions of the plurality of hidden states of the continuous hidden Markov model grouped into one group using the output probability and the transition probability of a hidden state of the discrete hidden Markov model.

(Supplementary Note 27)

The traffic analysis method according to any one of Supplementary Notes 24 to 26, comprising:

inferring an application state corresponding to a selected time series data from the time series data based on the model; and determining an application state corresponding to the time series data based on the inferred application state and application characteristics registered in advance.

(Supplementary Note 28)

The traffic analysis method according to Supplementary Note 27, comprising determining an application state based on a similarity between a sequence of the inferred application states and a sequence of application characteristics registered in advance.

(Supplementary Note 29)

The traffic analysis method according to Supplementary Note 27 or 28, comprising determining the application quality (Quality of Experience (QoE)) based on the application state.

(Supplementary Note 30)

The traffic analysis method according to any one of Supplementary Notes 16 to 29, comprising performing at least one of network control and communication control based on the application state, the application quality (QoE) calculated based on the application state, or the result of predicting a future application state.

(Supplementary Note 31)

A program causing a computer to execute:

information amount calculation processing of calculating an information amount of each of a plurality of items of time series data relating to communication traffic; and input information selection processing of selecting at least one item of time series data based on the information amounts of the plurality of items of time series data.

(Supplementary Note 32)

The program according to Supplementary Note 31, wherein the plurality of items of time series data relating to the communication traffic are a plurality of items of time series data relating to the same communication traffic and having a plurality of attributes with a common time axis.

(Supplementary Note 33)

The program according to Supplementary Note 31 or 32, wherein the information amount calculation processing calculates as the information amount an information amount that serves as an index indicating suitability for extracting a characteristic pattern from the time series data of the communication traffic.

(Supplementary Note 34)

The program according to any one of Supplementary Notes 31 to 33, wherein the information amount calculation processing calculates a sample entropy of the time series data of the communication traffic as the information amount.

(Supplementary Note 35)

The program according to Supplementary Note 34, wherein the input information selection processing selects at least one item of time series data based on the value of the sample entropy.

(Supplementary Note 36)

The program according to any one of Supplementary Notes 31 to 35, causing the computer to execute an input information generation processing of generating time series data obtained by performing arithmetic processing on the time series data of the communication traffic and of supplying the generated data to the information amount calculation part.

(Supplementary Note 37)

The program according to any one of Supplementary Notes 31 to 36, causing the computer to execute an application information observation processing of acquiring application information relating to the communication traffic and supplying the acquired information to the input information generation part.

(Supplementary Note 38)

The program according to Supplementary Note 37, causing the computer to execute a cause analysis processing of analyzing a cause of being in an application state inferred based on the selected time series data.

(Supplementary Note 39)

The program according to any one of Supplementary Notes 31 to 38, causing the computer to execute a model creation processing of creating a probabilistic state transition model for representing a pattern and a transition thereof in time series data of the communication traffic selected in the input information selection processing based on the time series data.

(Supplementary Note 40)

The program according to Supplementary Note 39, wherein the model creation processing models a state transition in the time series data of the communication traffic selected in the input information selection processing with a state transition model utilizing a hidden Markov model, groups a plurality of hidden states of the hidden Markov model in a time interval of the time series data, in which similar fluctuations are repeated, and which is modeled with the plurality of hidden states, and models the collected states with a hidden state of an upper layer hidden Markov model immediately above the hidden Markov model.

(Supplementary Note 41)

The program according to Supplementary Note 40, wherein the model creation processing models a state transition in the time series data of the communication traffic selected by the input information selection part with a continuous hidden Markov model, has a discrete hidden Markov model as the hidden Markov model at the layer immediately above the continuous hidden Markov model, and creates a hierarchical model that models output transitions of the plurality of hidden states of the continuous hidden Markov model grouped into one group using the output probability and the transition probability of a hidden state of the discrete hidden Markov model.

(Supplementary Note 42)

The program according to any one of Supplementary Notes 39 to 41 causing the computer to execute:

an application state inference processing of inferring an application state corresponding to the time series data selected in the input information selection processing from the time series data based on the model; and an application state determination processing of determining an application state corresponding to the time series data based on the inferred application state and application characteristics registered in advance.

(Supplementary Note 43)

The program according to Supplementary Note 42, wherein the application state determination processing determines an application state based on a similarity between a sequence of the inferred application states and a sequence of application characteristics registered in advance.

(Supplementary Note 44)

The program according to Supplementary Note 42 or 43, causing the computer to execute a QoE calculation processing of determining the application quality (QoE) based on the application state.

(Supplementary Note 45)

The program according to any one of Supplementary Notes 42 to 44, causing the computer to execute a processing of performing at least one of network control and communication control based on the application state, the application quality (QoE) calculated based on the application state, or the result of predicting a future application state.

What is claimed is:

1. A computer implemented traffic analysis method comprising:
    receiving a packet, from a packet capture that captures the packet flowing through a communication network to monitor communication traffic flowing through the communication network;
    acquiring a plurality of items of time series data relating to the communication traffic;
    calculating a sample entropy, as an information amount of each of a plurality of items of time series data relating to communication traffic;
    selecting at least one item of time series data based on the information amounts of the plurality of items of time series data; and
    performing inference of an application state which is a source of the communication traffic, based on the at least one item of time series data selected as the analysis target.

2. The computer implemented traffic analysis method according to claim 1, wherein the plurality of items of time series data relating to the communication traffic are relating to the same communication traffic and have a plurality of attributes with a common time axis.

3. A traffic analysis apparatus comprising:
    a processor; and
    a memory in circuit communication with the processor,
    wherein the processor, when executing program instructions stored on the memory,
    receives a packet, from a packet capture that captures the packet flowing through a communication network to monitor communication traffic flowing through the communication network;
    acquires a plurality of items of time series data relating to the communication traffic;
    calculates a sample entropy, as an information amount of each of a plurality of items of the time series data relating to the communication traffic;
    selects at least one item of time series data as an analysis target from the plurality of items of time series data based on the information amount of each of the plurality of items of time series data; and
    performs inference of an application state which is a source of the communication traffic, based on the at least one item of time series data selected as the analysis target.

4. The traffic analysis apparatus according to claim 3, wherein the plurality of items of time series data relating to the communication traffic are relating to the same communication traffic and have respectively a plurality of attributes with a common time axis.

5. The traffic analysis apparatus according to claim 3, wherein the processor, when executing the program instructions stored on the memory, calculates as the information amount an information amount that serves as an index indicating suitability for extracting a characteristic pattern from the time series data of the communication traffic.

6. The traffic analysis apparatus according to claim 3, wherein the processor, when executing the program instructions stored on the memory, selects at least one item of time series data based on a value of the sample entropy.

7. The traffic analysis apparatus according to claim 3, wherein the processor, when executing the program instructions stored on the memory, generates time series data obtained by performing arithmetic processing on the time series data relating to the communication traffic.

8. The traffic analysis apparatus according to claim 7, wherein the processor, when executing the program instructions stored on the memory, acquires application information relating to the communication traffic.

9. The traffic analysis apparatus according to claim 8, wherein the processor, when executing the program instructions stored on the memory, analyzes a cause of being in the application state inferred based on the time series data selected.

10. The traffic analysis apparatus according to claim 3, wherein the processor, when executing the program instructions stored on the memory, based on the time series data relating to the communication traffic selected, creates a probabilistic state transition model for representing a pattern and a transition of the time series data.

11. The traffic analysis apparatus according to claim 10, wherein the processor, when executing the program instructions stored on the memory, models a state transition in the selected time series data relating to the communication traffic with a state transition model utilizing a hidden Markov model,
    groups a plurality of hidden states of the hidden Markov model in a time interval of the time series data in which similar fluctuations are repeated, and which is modeled with the plurality of hidden states into one group, and
    models the plurality of hidden states with one hidden state of an upper layer hidden Markov model immediately above the hidden Markov model.

12. The traffic analysis apparatus according to claim 11, wherein the processor, when executing the program instructions stored on the memory, models a state transition in the selected time series data relating to the communication traffic with a continuous hidden Markov model,
    uses a discrete hidden Markov model as the upper layer hidden Markov model immediately above the continuous hidden Markov model, and creates a hierarchical model that models output transitions of the plurality of hidden states of the continuous hidden Markov model grouped into one group using an output probability and a transition probability of a hidden state of the discrete hidden Markov model.

13. The traffic analysis apparatus according to claim 10, wherein the processor, when executing the program instructions stored on the memory, infers, based on the probabilistic state transition model, the application state corresponding to the selected time series data, and
determines the application state corresponding to the time series data, based on the inferred application state and application characteristics registered in advance.

14. The traffic analysis apparatus according to claim 13, wherein the processor, when executing the program instructions stored on the memory, determines the application state, based on a similarity between a sequence of the inferred application states and a sequence of application characteristics registered in advance.

15. The traffic analysis apparatus according to claim 13, wherein the processor, when executing the program instructions stored on the memory, determines an application quality (Quality of Experience: QoE) based on the application state.

16. The traffic analysis apparatus according to claim 15, wherein the processor, when executing the program instructions stored on the memory, performs at least one of network control and communication control, based on the application state, the application quality (QoE) calculated based on the application state, or a prediction result of a future application state.

17. A non-transitory computer readable medium storing a program causing a computer to execute processing comprising:
receiving a packet, from a packet capture that captures the packet flowing through a communication network to monitor communication traffic flowing through the communication network;
acquiring a plurality of items of time series data relating to the communication traffic;
calculating a sample entropy, as an information amount of each of a plurality of items of time series data relating to communication traffic;
selecting at least one item of time series data based on the information amounts of the plurality of items of time series data; and
performing inference of an application state which is a source of the communication traffic, based on the at least one item of time series data selected as the analysis target.

18. The computer-readable recording medium according to claim 17, wherein the plurality of items of time series data relating to the communication traffic are relating to the same communication traffic and have a plurality of attributes with a common time axis.

* * * * *